United States Patent [19]
Garland

[11] Patent Number: 5,394,461
[45] Date of Patent: Feb. 28, 1995

[54] TELEMETRY FEATURE PROTOCOL EXPANSION

[75] Inventor: Stuart M. Garland, Morton Grove, Ill.

[73] Assignee: AT&T Corp., Murray Hill, N.J.

[21] Appl. No.: 60,322

[22] Filed: May 11, 1993

[51] Int. Cl.$^6$ .......................................... H04M 11/00
[52] U.S. Cl. .................................... 379/106; 379/107
[58] Field of Search ............................. 379/104–107, 379/102, 92

[56] References Cited

U.S. PATENT DOCUMENTS 5,189,694  2/1993  Garland ............................. 379/106

FOREIGN PATENT DOCUMENTS 0474407  3/1992  European Pat. Off. .... H04M 11/00

Primary Examiner—Wing F. Chan
Attorney, Agent, or Firm—Ross T. Watland; Werner Ulrich

[57] ABSTRACT

An expanded telemetry feature protocol allowing the provision of additional transport capabilities: 1) switch alert of CPE or voice equipment, 2) activation of other switch capabilities, 3) a barge-in capability, and 4) a broadcast capability. A telemetry function identification is included in the protocol to define a plurality of telemetry applications. Other extensions to the protocol allow sequential broadcast of voice or data to a list of destinations, operation with an analog display station interface (ADSI) station, and subaddressing to specify particular destinations.

15 Claims, 19 Drawing Sheets

TELEMETRY FEATURE PROTOCOL EXPANSION

TECHNICAL FIELD

This invention relates to telecommunications and telemetry.

BACKGROUND AND PROBLEM

Please refer to FIGS. 1-6 and to the Prior Art section of the Detailed Description herein where a prior art system is described in detail. The prior art system is also disclosed in U.S. Pat. No. 5,189,694, issued to S. M. Garland on Feb. 23, 1993.

The existing telemetry protocol includes a basic transport capability for many applications such as meter reading, load shed applications, and other services from Utilities or Enhanced Service Providers (ESPs). However, for more robust applications, additional protocol information is required to deliver these applications. The following additional transport capabilities are required:
1. Switch alert of Customer Premises Equipment (CPE) or voice equipment
2. Activation of other switch capabilities
3. A Barge-In capability
4. A Broadcast capability The telemetry protocol must continue to support two way initiated communication (to the CPE and from the CPE).

SOLUTION

The basic protocol must be expanded to provide for these capabilities. The protocol expansion is comprised of a revised definition of each of the two existing telemetry protocol strings. An optional third protocol string is required for some capabilities. 1. The first protocol string is redefined to include instructions to the switch regarding various parameters required for the transport of these services. Tables 1 and 2 herein identify the various parameters used in the examples of transport capability described in the Detailed Description. The new parameters inform the switch to:
a. Define the CPE alerting method The CPE alerting method defines which type of alert the switch is to provide to the CPE. Examples are power ringing, no or abbreviated ringing (suppressed ringing), a new dual tone On-Hook CPE alerting signal, or single/multiple tones. Power ringing could be used to deliver a voice message from an ESP or the switch itself. Suppressed ringing would allow for the Central Office Service Unit (COSU) to provide the CPE alert. The single alerting tones are used in meter reading today. The new On-Hook CPE alerting signal will be used to alert CPE that is On-Hook and is a companion to the analog display station interface (ADSI) Off-Hook CPE alerting signal (CAS) used when the ADSI phone is Off-Hook.

b. Define switch function codes which instruct the switch to: 1. Connect to an Idle line (returning Busy) or Barge-In to a Busy line. 2. Provide an Alerting signal to the phone, CPE, or none (COSU alert). 3. Provide No or Off-Hook line supervision 4. Expect a third protocol string providing the switch with additional data. 5. Activate other switch capabilities after the CPE goes Off-Hook.

After the CPE goes Off-Hook, the telemetry feature, acting as a transport, could turn the line side control over to another switch based application. The telemetry feature would also return Off-Hook to the COSU as an indicator the CPE has been alerted.

c. Define subaddressing codes to further identify the destination CPE.

Subaddressing codes allow the switch to output a specific code identifying the specific CPE from a group of multiple CPE's to be communicated with at a single Directory Number. 2. The second protocol string is expanded to include the identification of a list which contained the Directory Number destinations. This capability would allow a utility/ESP to, for example, indicate a list of predefined Directory Numbers for broadcast purposes. 3. A third protocol string is added. This additional string is used to supplement some of the previously identified telemetry protocol strings. This additional string contains additional data, switch actions, or directives. Examples of data that may be contained in this string are the message for the switch to broadcast, lists of Directory Numbers, or other data needed by the switch.

DRAWING DESCRIPTION

DETAILED DESCRIPTION

Figure 1:
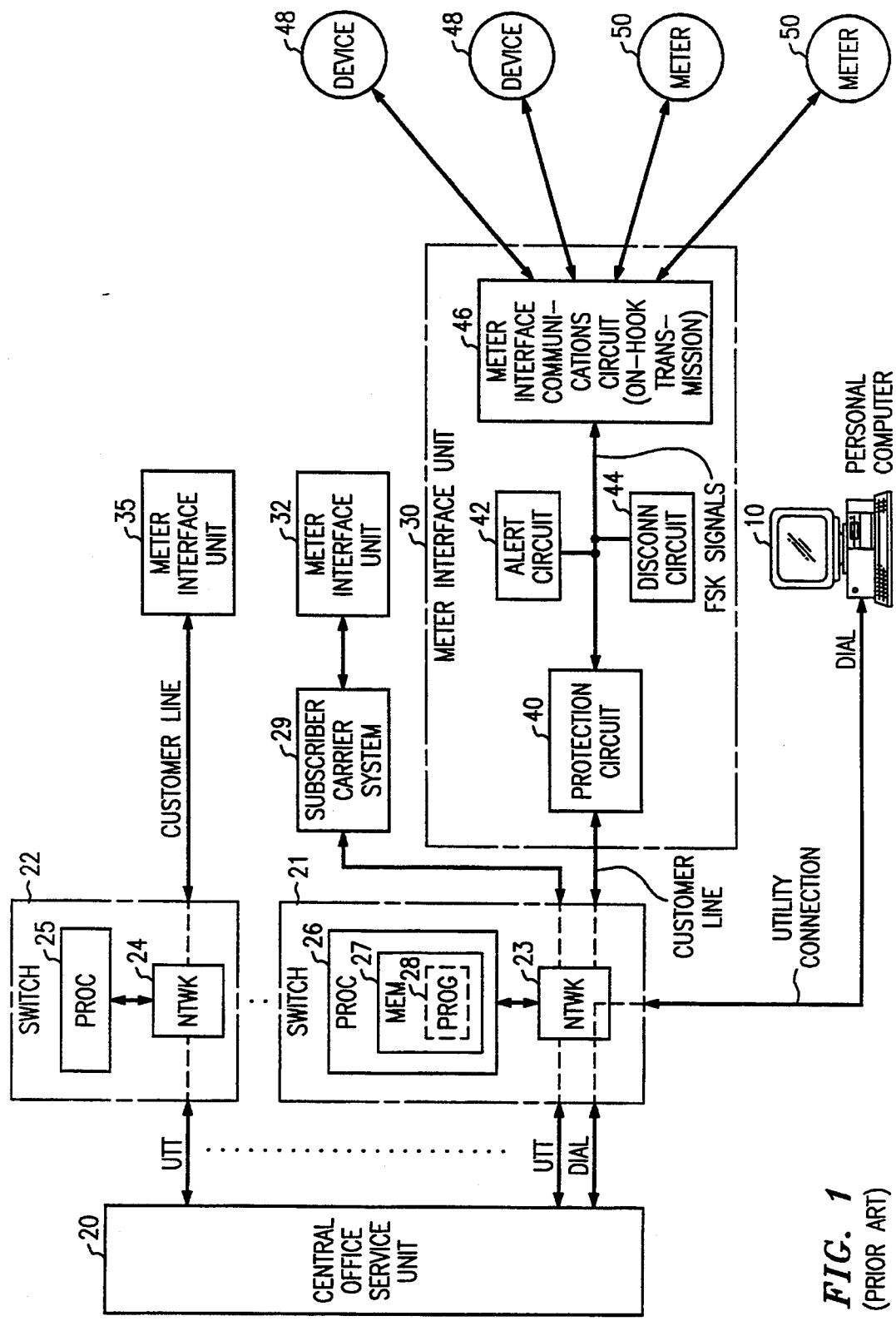
FIG. 1 is a block diagram of a prior art system and illustrating connections for accessing customer meters and devices.
Figure 7:
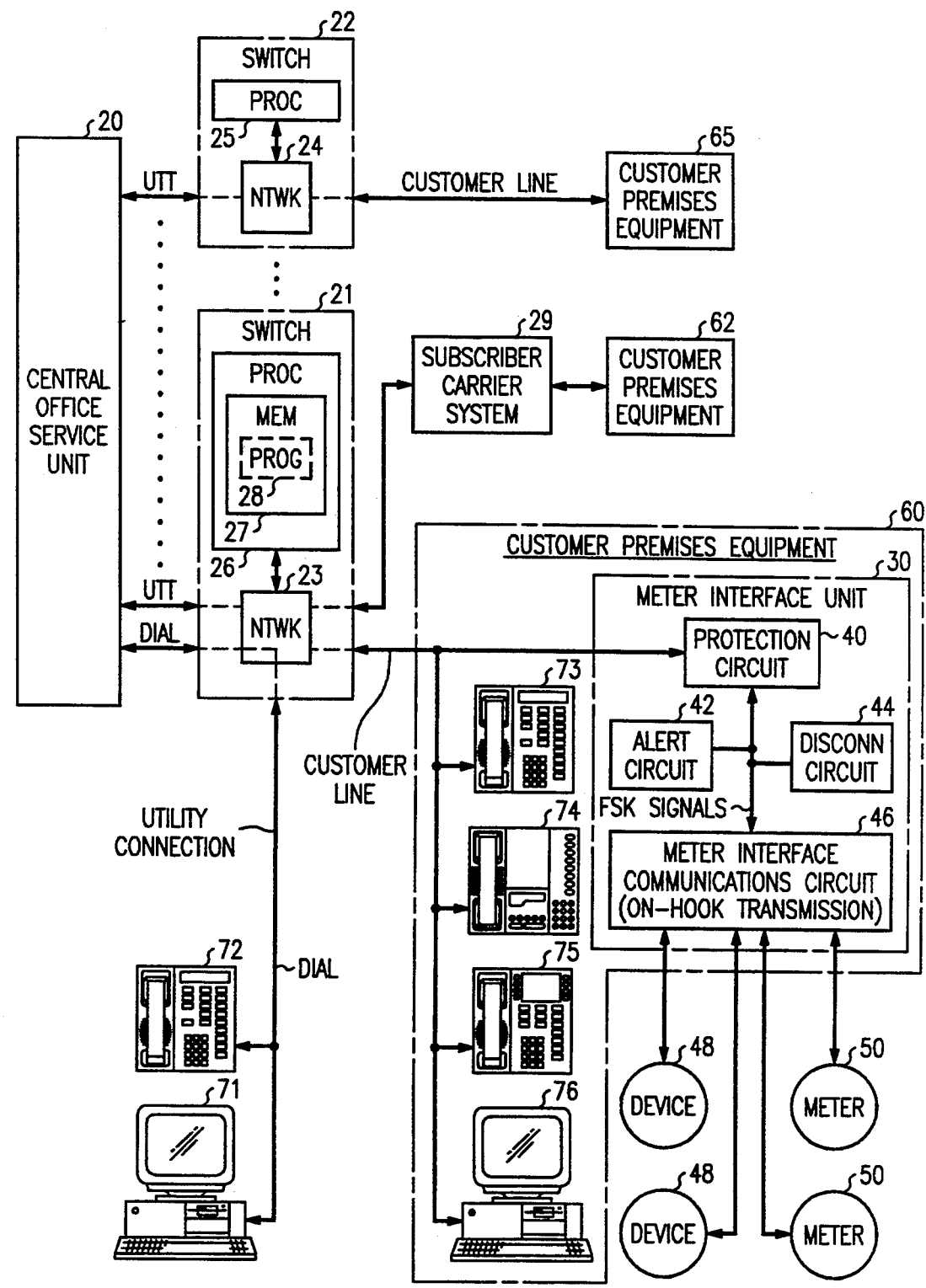
FIG. 7 is a block diagram of a system in accordance with the present invention.

FIG. 7 is a diagram of a system in accordance with the present invention and is based on the FIG. 1 system. In addition to the meter interface unit 30, the following additional equipment is also connected to the analog customer line: 1) an analog voice station 73, 2) an answering machine 74, 3) an analog display station interface (ADSI) station 75 (Bellcore Technical Reference TR-NWT-01273 "Generic Requirements for an SPCS to Customer Premises Equipment Data Interface for Analog Display Services", December 1992, and Bellcore Special Report SR-NWT-002495 "Guidelines for Writing Applications Which Use the Analog Display Services Interface (ADSI) for Data Communications", December 1992), and 4) a personal computer 76. The grouping of CPE is referred to as CPE 60, and similar groupings are included in CPE 62 and CPE 65. In addition to personal computer 71, an analog voice station 72 is also connected to switch 21 via the utility connection. The new protocol described herein for signaling on the utility telemetry trunks (UTTs) between central office service unit (COSU) 20 and switches 21 and 22 allows the performance of the thirteen applications described in the section "Examples of Implementation".

Existing UTT Protocol
KP+ANI II+ANI+ST
KP+7/10 DN+ST(ST', ST", ST''') Modified UTT Protocol
KP+TFI+ANI+ST(ST', ST", ST''')
KP+DN/Directive+ST(ST', ST", ST''')
KP+NNNN+ST
where:

TFI=Telemetry Function Identification (a switch directive) composed of XX YYY ZZZZ digits
XX=99 CPE alert codes (table 2)
YYY=999 switch function codes (table 1)
ZZZZ=Up to 8 digits, in the range of 0 to 7. Each digit represents the first 3 bits of a binary string. The 8 digits combine to form a binary string of 24 bits representing 16777216 combinations to be used for device subaddressing. Each ST digit in the first protocol string would represent the presence of Z digits. For example, ST=two Z digits present, ST'=four Z digits present, ST"=six Z digits present, and ST'''=eight Z digits present. The variable number of Z digits is to reduce the transmission time of the protocol string. In addition, Recent Change procedures for updating translations can be used to allow or not allow the presence of Z digits thereby making the protocol more efficient.
ANI=Billing Directory Number (no change from the existing telemetry protocol)
7/10 DN=Seven/Ten digit Directory Number to connect to (no change from the existing telemetry protocol)
Directive=This parameter will be used to identify a previously defined List identifier. For example, this parameter, in a broadcast capability, could identify the list of Directory Numbers to send the broadcast to. The parameter could also identify the list when the list is input to the switch.
NNNN=A variable length string of information, which could be a message to be sent to the CPE, a list of Directory Numbers to be used in a broadcast message, or a function to be performed.

The protocol is described in terms of Multifrequency (MF) digits. If the third protocol string contains other than digits 0-9 (ASCII or binary data), a data link (I/O channel) may be required to input the information. This protocol can also be converted to any other digital switch input technique such as a PRI link.

TABLE 1

| | TELEMETRY FUNCTION IDENTIFICATION (TFI)-SWITCH FUNCTION CODES | | | | | | | | |
|---|---|---|---|---|---|---|---|---|---|
| | Connect To | | Line Alert | | Line Supervision | | Additional | Activate Sw | |
| Function Code | Idle Line | Busy Line | From Switch To Phone | From COSU To CPE | Off-Hook Supervision | No Supervision | Data String | Process After CPE Off-Hook | Application |
| 000 | X | — | — | X | — | X | — | — | Telemetry, AMR, ESP data to CPE |
| 001 | X | — | — | X | — | X | — | — | ESP data to CPE, Oper Sys test of CPE |
| 002 | X | — | — | X | — | X | — | ADSI | ESP data to CPE, Oper Sys test of CPE, ADSI |
| 003 | — | — | — | — | — | — | X | — | Load Broadcast List |
| 004 | X | — | — | X | — | X | X | — | Broadcast ESP data to CPE |
| 005 | X | — | — | X | — | X | X | ADSI | Broadcast ESP data to CPE/ ADSI |
| 006 | — | — | — | — | — | — | X | — | Broadcast success or failure report |
| 007 | — | — | — | — | — | — | — | — | Request broadcast status |
| 008 | X | — | X | — | — | X | — | — | ESP Voice message to CPE |
| 009 | X | — | X | — | — | X | — | — | ESP Broadcast Voice message to CPE Barge-In cases |
| 010 | — | X | — | — | X | — | X | — | Telemetry, AMR, ESP data to CPE |
| 011 | — | X | — | X | — | — | X | — | ESP data to CPE, Oper Sys test of CPE |
| 012 | — | X | — | X | — | — | X | ADSI | ESP data to CPE, Oper Sys test of CPE, ADSI |
| 013 | — | X | — | X | — | — | X | X | — | Broadcast ESP data to CPE |
| 014 | — | X | — | X | — | — | X | X | ADSI | Broadcast ESP data to CPE/ ADSI |
| 015 | — | X | — | — | — | — | X | — | ESP Voice message to CPE |
| 016 | — | X | — | — | — | — | X | X | — | ESP Broadcast Voice message to CPE |

TABLE 2

TELEMETRY FUNCTION IDENTIFICATION (TFI)-CPE ALERT CODES

| Alert Code | Alert Type | Application |
| --- | --- | --- |
| 00 | No alert | COSU/ESP alert, AMR |
| 01 | Power Ring | Voice Messaging |
| 02 | CPE On-Hook Alert Signal | New Dual Tone Alert for On-Hook CPE |
| 03–05 | Dual Tones | CPE (TIU) Off-Hook alert codes |
| 06–08 | Dual Tones | CPE (TIU) On-Hook alert codes |

Examples of Implementation

1. Telemetry, Automatic Meter Reading, ESP data to/from CPE

The protocol for this example is:
KP+TFI+ANI+ST(ST', ST", ST''')
KP+DN+ST(ST", ST", ST''')
where:

TFI = Alert Function Subaddress (see Tables 1 and 2)
= 00 000 00

Alert=00 indicates there is no alert from the switch

Function=000 indicates the COSU is to alert the CPE, the switch is to return Busy if the line is Busy, there is no switch supervision of the line, and there is no third information string.

Subaddress=00 indicates there is no subaddress to be sent to the CPE. The switch does not alert the CPE, therefore there are no subaddress from the switch. The subaddresses, if any, must be supplied by the COSU.

DN=Destination Directory Number
ANI=Billing telephone number
ST=Indicates only two subaddress digits are present. An Recent Change field can be created that would indicate No subaddress digits present thereby decreasing the time to send the digits to the switch.

For inbound applications, the subaddress field in the TFI may be used to identify the CPE subaddress to the utility/ESP. The inbound alert is an implied alert (Off-Hook) to the COSU.

Figure 8:
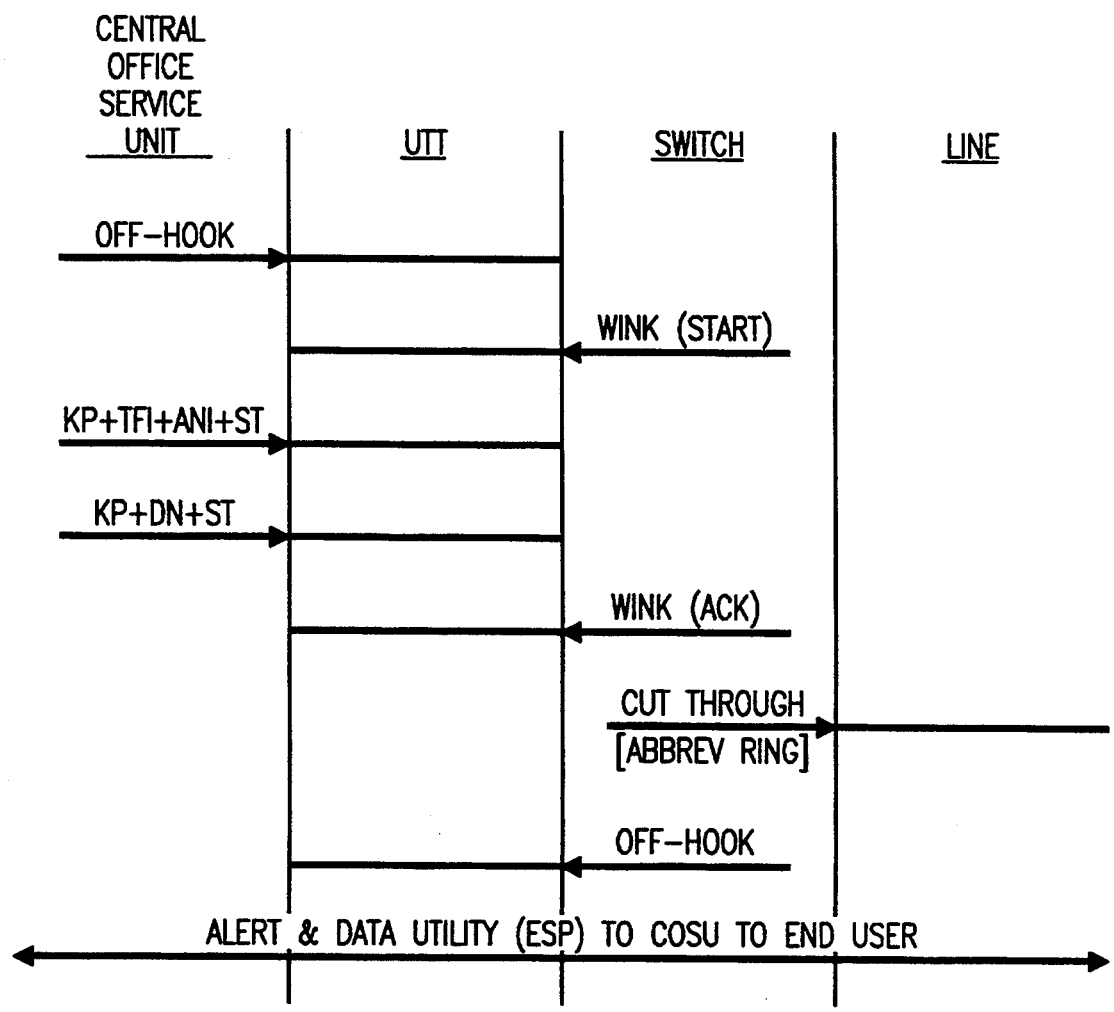
FIGS. 8-21 are signaling sequence diagrams for the system of FIG. 7.

Refer to FIG. 8. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end users line, sending abbreviated ringing, if instructed, and returns Off-Hook to the COSU. The COSU alerts the TIU (CPE) and exchanges data. The COSU and/or TIU (CPE) is responsible for detecting the end user going Off-Hook and taking down the telemetry call.

Figure 9:
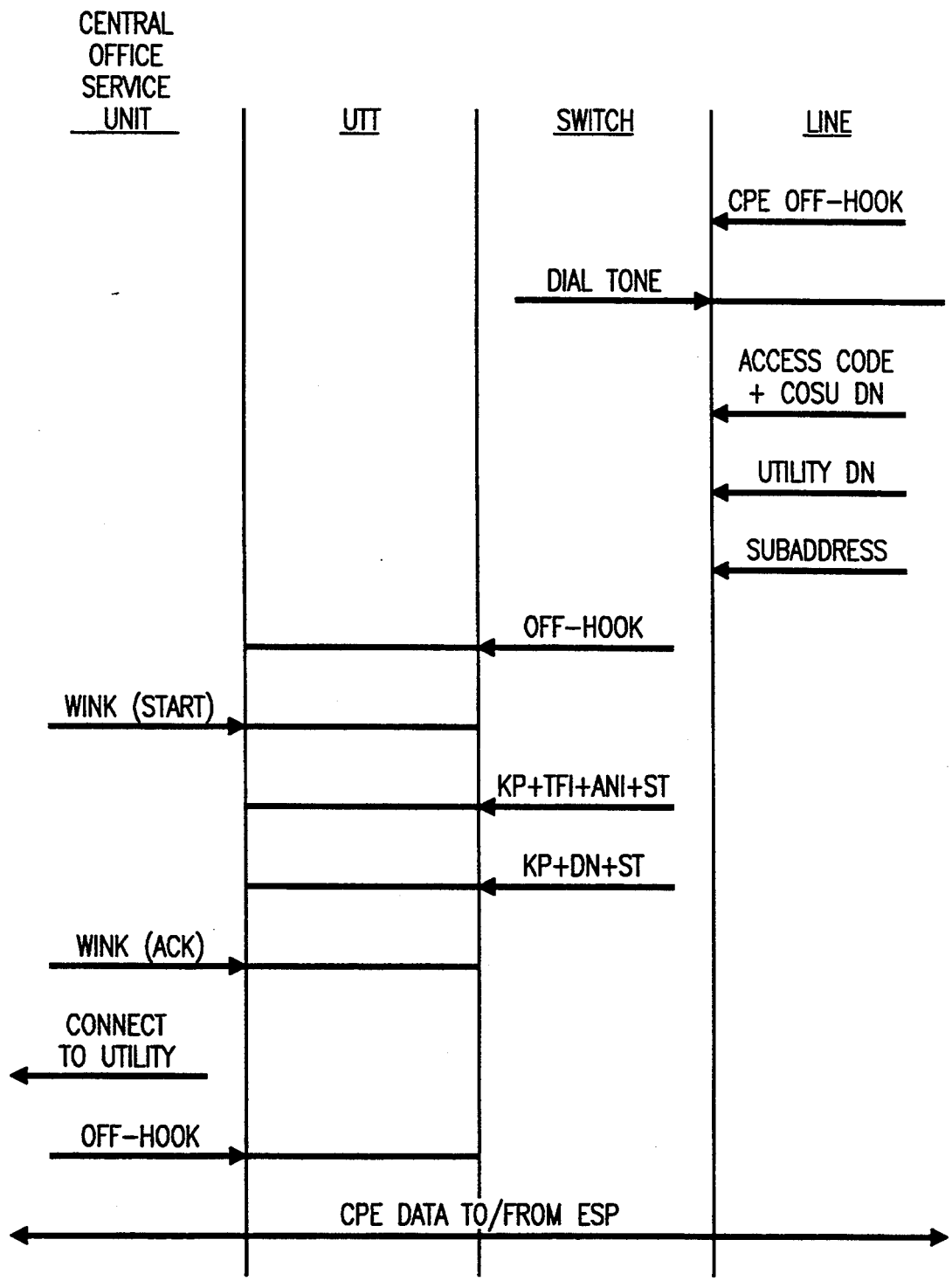

Refer to FIG. 9. Inbound applications would be used, for example, by a CPE device to report status after a load shed command or by a CPE device requesting a new download after finding a memory parity error. In this case, the CPE would go Off-Hook, dial the telemetry access code, the destination Directory Number of the COSU, the destination Directory Number of the utility, and include its subaddress. In this case, the switch initiates the UTT connection by going Off-Hook. The COSU responds with a Wink (Start). The switch sends the two strings of information which contain the subaddress of the calling device. The two strings of information are acknowledged by a Wink (ACK). The COSU connects to the utility/ESP and returns Off-Hook to the switch. The communications protocol between the COSU and the utility/ESP can contain the ANI (calling number) and the subaddress of the device. Data is exchanged between the CPE and utility/ESP. The COSU and/or CPE is responsible for detecting the end user going Off-Hook and taking down the telemetry call. It is not sufficient for the CPE to go On-Hook since the end user is already Off-Hook.

If the end user has Call Waiting assigned to the line, the telemetry call will not activate Call Waiting or Caller ID on Call Waiting (CIDCW).

2. Switch/ESP/Utility data to CPE

This example is similar to the first example except the switch provides the CPE alert, subaddressing, and an Off-Hook signal to the COSU which indicates the CPE went Off-Hook. Applications for this technique are meter reading and switch initiated applications. For example, in a meter reading application, since the CPE has gone Off-Hook, the switch and therefore the COSU will know the TIU (CPE) has gone Off-Hook. The TIU/COSU is still responsible for call termination when the end user goes Off-Hook. Since the switch has control of the CPE alert function and subaddress, the switch can internally initiate calls for such things as broadcast to various TIU (CPE) devices, Operations Systems testing of CPE, Operations Systems or service order initiated changes to CPE, or other switch initiated communications functions.

The protocol for this example is:
KP+TFI+ANI+ST(ST', ST", ST''')
KP+DN+ST(ST', ST", ST''')
where:

TFI = Alert Function Subaddress (see Tables 1 and 2)
= 02 001 05

Alert=02 indicates the switch is to sent a new CPE On-Hook alert signal [similar to the CPE Off-Hook alert signal (CAS) defined in TR 30].

Function=001 indicates that, if the CPE is On-Hook, the switch is to alert the CPE based on the alert signal defined above, the switch is to return Busy if the line is Busy, an Off-Hook is to be returned from the CPE after it is alerted and the subaddress received, and there is no third information string.

Subaddress=05 indicates a subaddress of 5 will be sent to the CPE (indicating, for example, extension 5 at the specified Directory Number) after the CPE On-Hook alert signal. Upon receiving the subaddress the CPE (at subaddress 5) will go Off-Hook.

ST (first string)=indicates only two subaddress digits are present

Using other alert codes would allow the switch to alert other specialized CPE on the line when necessary. For example, special alert codes can be used to differentiate between different CPE devices. It is strongly recommended that the new CPE On-Hook alert signal be used for all CPE devices.

Figure 10:
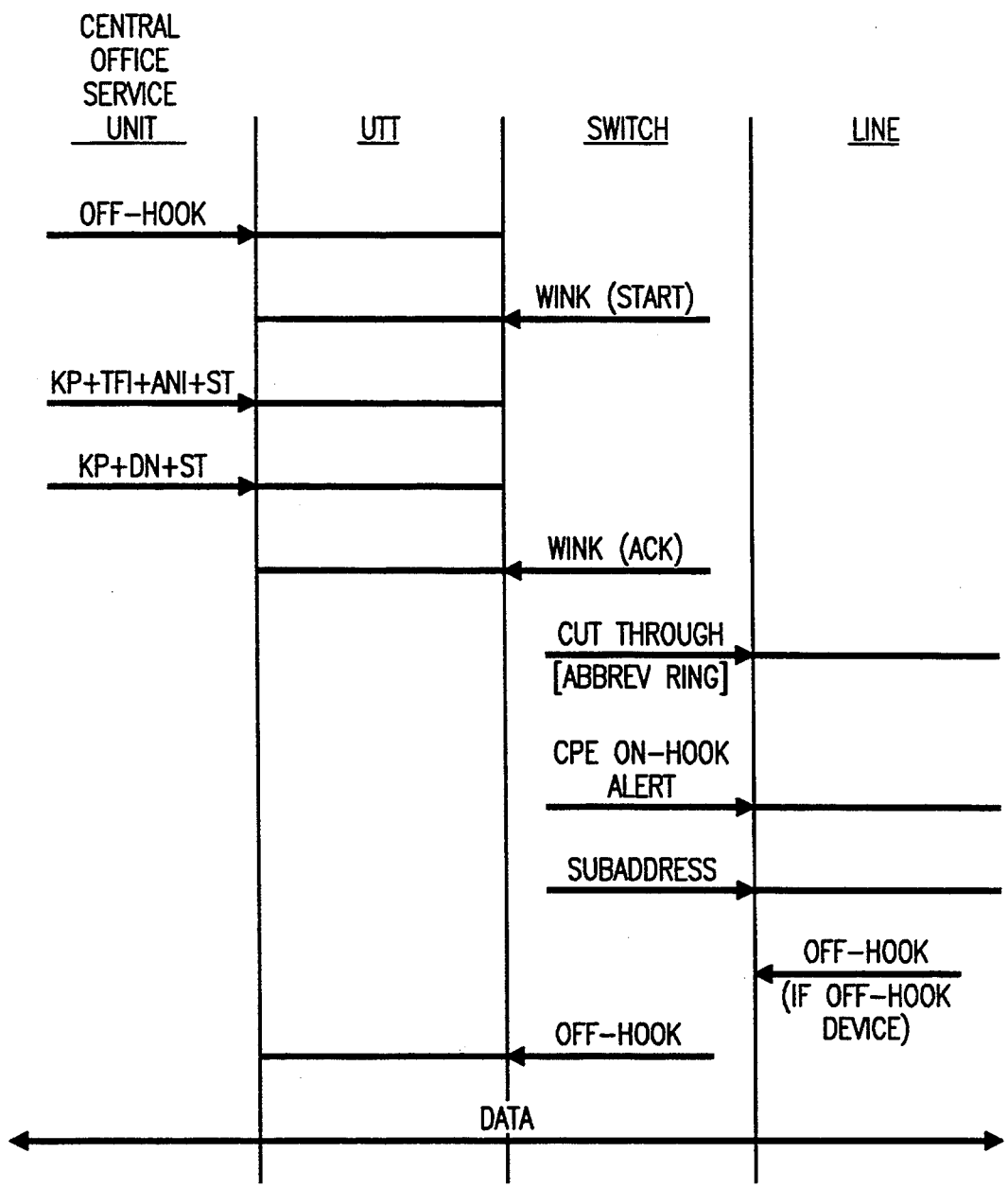

Refer to FIG. 10. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated ringing, if instructed. The switch then sends the CPE On-Hook alert signal and subaddress. If the CPE device is present, the CPE goes Off-Hook. The switch returns Off-Hook to the COSU. The COSU and CPE exchange data. The COSU and/or CPE is responsible for detecting the end user Off-Hook and causing the call to be taken down.

If the CPE is already Off-Hook, Busy will be returned to the COSU since there is no knowledge as to which CPE subaddress is Off-Hook. Rather than provide a false indication of the correct device being Off-Hook, a Busy is returned.

After the switch returns Off-Hook to the COSU, data is exchanged between the ESP and CPE.

If the end user has Call Waiting assigned to the line, the telemetry call will not activate Call Waiting or Caller ID on Call Waiting (CIDCW). Additionally, in response to received signaling, the switching system deactivates a class of features of said switching system for one of the lines, controls a telemetry call from the accessing device, COSU (20), via the at least one trunk and the network to a destination connected to that line, and reactivates the said class of features after completion of the call.

A Barge-In case is provided which allows the ESP to barge-in on existing conversations.

3. Switch/ESP/utility data to CPE—ADSI type CPE

This example is similar to the previous example except the protocol specifies additional switch capabilities the telemetry feature must interact with to complete the call. In this example, the telemetry feature, after providing the connection, the new CPE On-Hook alert signal and subaddress to the CPE, gives line side control to the ADSI capability. The ADSI capability provides the ADSI alert. The telemetry feature returns Off-Hook to the COSU. The message is delivered to the ADSI CPE. If the line is already Off-Hook and Call Waiting is active, the CIDCW process is activated.

The protocol for this example is:
KP+TFI+ANI+ST(ST', ST", ST''')
KP+DN+ST(ST', ST", ST''')
where:

TFI = Alert Function Subaddress (see Tables 1 and 2)
= 02  002  05

Alert=02 indicates the switch is to send a new CPE On-Hook alert signal (similar to the CPE Off-Hook alert signal (CAS) defined in TR 30).

Function=002 indicates that, if the CPE is On-Hook, the switch is to alert the CPE based on the alert signal defined above, the switch is to return Busy if the line is Busy, an Off-Hook is to be returned from the CPE after it is alerted and the subaddress is received, and there is no third information string. The call is Call Waited if the CPE is Off-Hook.

Subaddress=05 indicates a subaddress of 5 will be sent to the CPE (indicating, for example, extension 5 at the Directory Number specified) after the CPE On-Hook alert signal. Upon receiving the subaddress the CPE will go Off-Hook.

ST (first string)=indicates only two subaddress digits are present.

Figure 11:
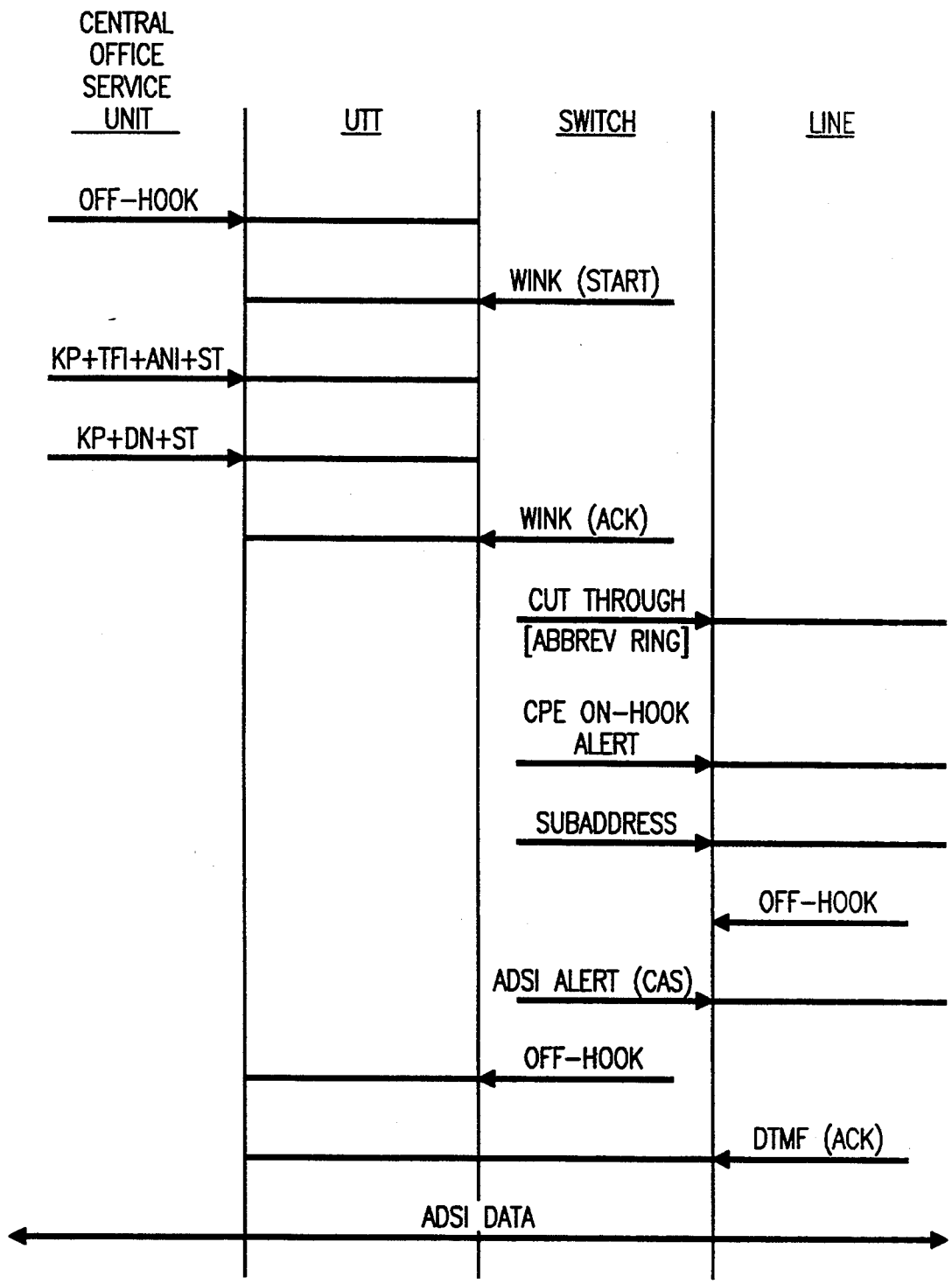

Refer to FIG. 11. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated tinging, if instructed. The switch sends the CPE On-Hook alert signal and subaddress. If the CPE is available, the CPE goes Off-Hook. The switch sends the ADSI alert signal (CAS) and Off-Hook is returned to the COSU. The ADSI CPE sends the DTMF (ACK), if available. This DTMF signal is transmitted to the COSU. ADSI data is exchanged between the ESP and CPE. The COSU/CPE is responsible for terminating the telemetry call.

If the CPE is already Off-Hook, and Call Waiting is not assigned to the line, Busy will be returned to the COSU.

If the end user has Call Waiting assigned to the line, the telemetry call will activate Caller ID on Call Waiting (CIDCW), using the CIDCW process. The telemetry feature will return Off-Hook to the COSU when the end user flashes for the waited call.

As discussed in an earlier example, the switch can internally initiate calls to the CPE providing communications for internal processes.

A Barge-In case is provided which allows the ASDI ESP to barge-in on existing conversations.

4. Load/Delete Broadcast List

This example defines a method to load or delete a list of Directory Numbers, alert codes, and subaddresses into the switch for later use with the broadcast capability. This list of information is to be received by the switch in the third information string. If this third information string only contains the digits 0 through 9, MF signaling can be used otherwise a data port or I/O channel must be used.

This information string is stored in the switch memory until it is required for switch use or transmission to the CPE.

The protocol for this example is:
KP+TFI+ANI+ST(ST', ST", ST''')
KP+MM+ST(ST', ST", ST''')
KP+NNNN+ST
where:

TFI = Alert Function Subaddress (see Tables 1 and 2)
= 00  003  00

Alert=00 indicates no alert is sent by the switch.

Function=003 indicates that the information contained in the third information string is to be considered a list of Directory Numbers (with alert codes and subaddresses) and stored in the switch memory for later use.

Subaddress=00 indicates there are no subaddresses to be sent to the CPE.

MM=indicates the broadcast list identifier. For example, 01 would identify list 1 and 02 would identify list 2.

NNNN = Directory Number list with alert codes and subaddresses. An example of such a list is:

[Alert Code 1, DN 1, Subaddress 1; Alert Code 2, DN 2, Subaddress 2; - - -]

A null third information string (KP+ST) implies "delete list defined as list MM".

Figure 12:
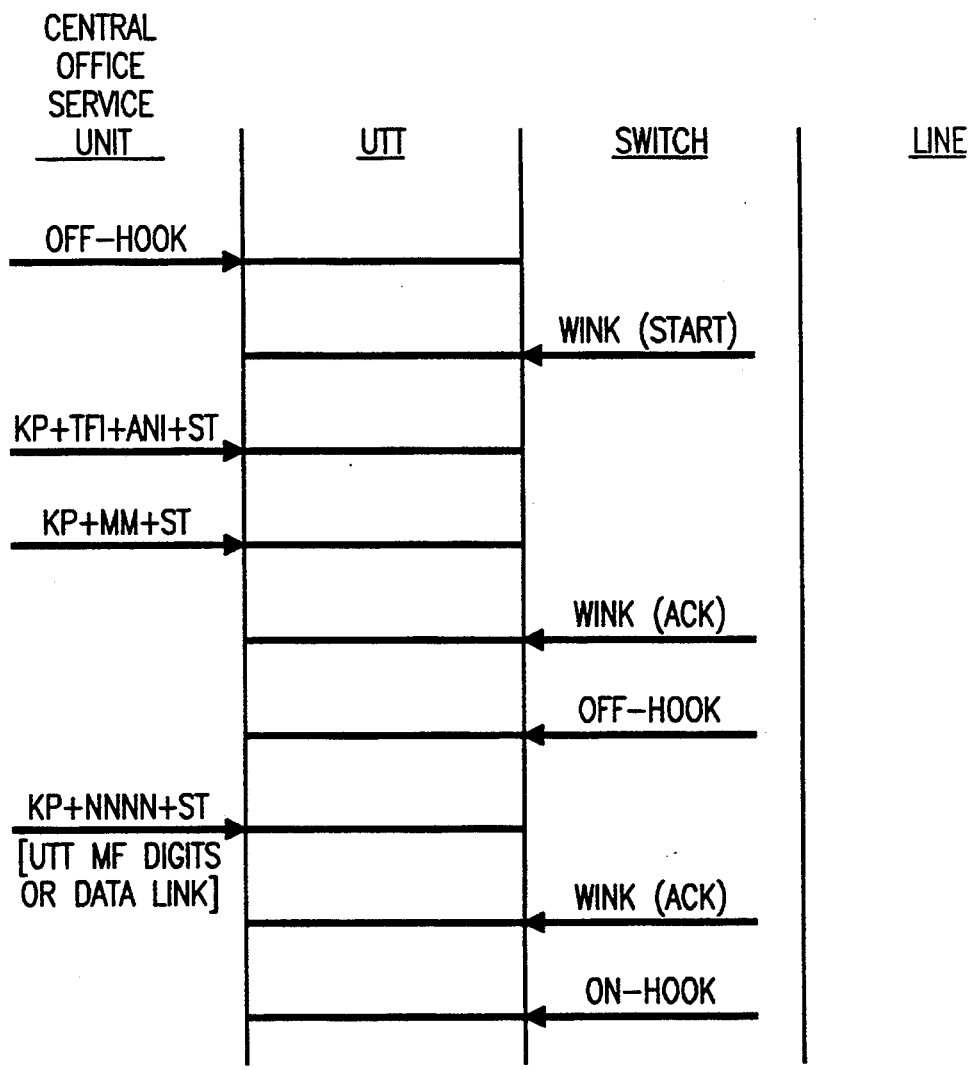

Refer to FIG. 12. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The COSU sends the switch the third information suing. The switch acknowledges the third information string with a Wink (ACK) and an On-Hook. The COSU returns On-Hook to complete the signaling protocol.

5. Broadcast to CPE—Information To Switch

This and the following example identifies how the switch is instructed to broadcast a given message (text or data) to CPE. This example instructs the switch to broadcast a message to an identified list. The list of Directory Numbers, alert codes, and subaddresses has already been stored in the switch memory. The third information string, in this protocol transaction, contains the information to be broadcast to each Directory Number. The information in the third string may also contain a time of day to broadcast the message or a priority rank of this information over other broadcast strings. The broadcast time element may be used for switch loading (traffic) constraints or emergency notification conditions.

The protocol for this example is:
KP+TFI+ANI+ST(ST', ST'', ST''')
KP+MM+ST(ST', ST'', ST''')
KP+NNNN+ST
where:

TFI = Alert Function Subaddress (see Tables 1 and 2)
= 00 004 00

Alert=00 indicates no alert is sent by the switch. For broadcast applications, the alert code is contained in the broadcast list of Directory Numbers in the switch memory.

Function=004 indicates that the information contained in the third information string (NNNN) is to be considered the information to be transmitted to the CPE.

Subaddress=00 indicates there are no subaddresses to be sent to the CPE. For broadcast applications, the subaddress is contained in the broadcast list of Directory Numbers in the switch memory.

MM=indicates the broadcast list identifier. For example, 01 would identify list 1 and 02 would identify list 2.

NNNN=An information string, either binary or text information, to be broadcast to each Directory Number in list MM. An example of such a list is:

["Your air conditioner has been turned off and will be restored at 11:00 AM"]

[Binary data to be loaded into a meter reading device causing the device to provide every half hour reading data]

The broadcast function requires an identification to the COSU/ESP of the success or failure to deliver the information message and a method to request a status of the broadcast command from the switch.

Figure 13:
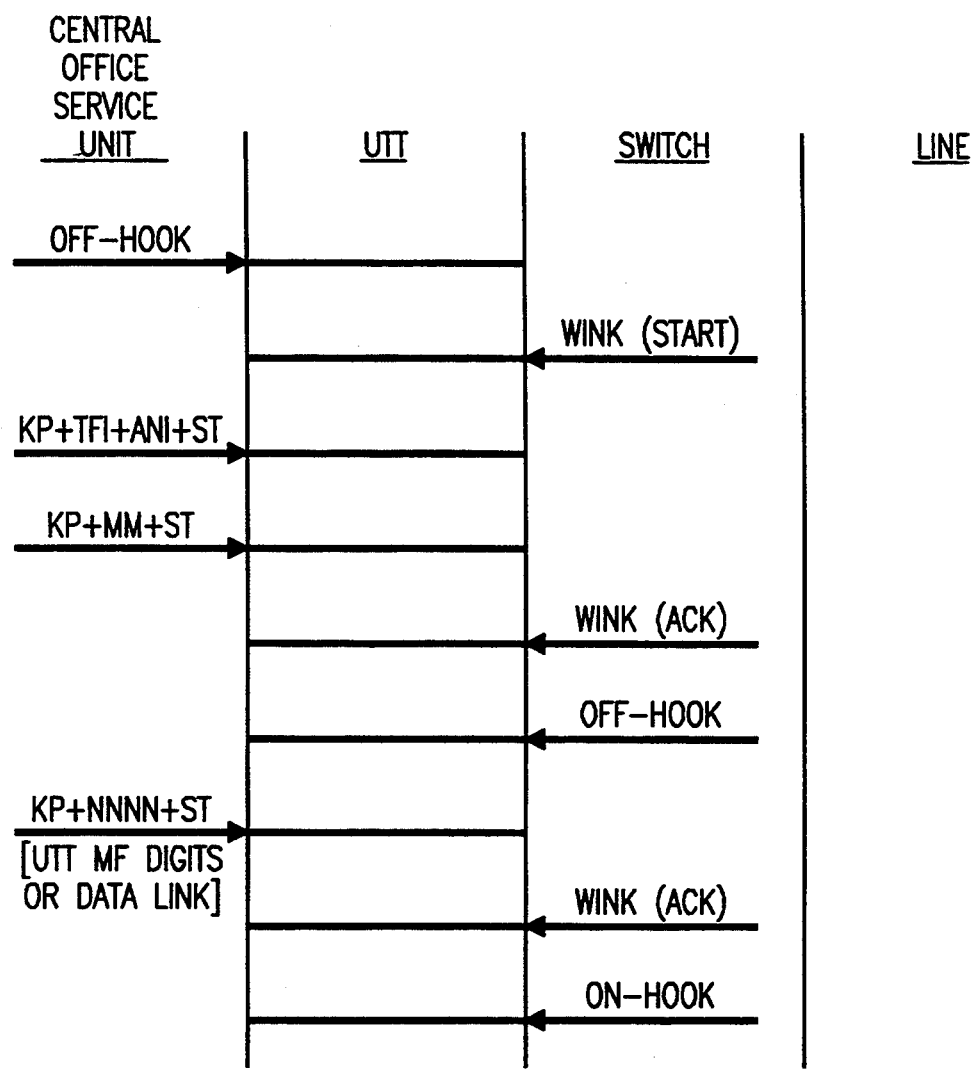

Refer to FIG. 13. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The COSU sends the switch the third information string. The switch acknowledges the third information string with a Wink (ACK) and an On-Hook. The COSU returns On-Hook to complete the signaling protocol.

6. Broadcast to CPE—Connect to CPE

This example identifies how the switch performs the actual broadcast function.

The broadcast of information to the CPE is similar to example 2 "ESP data to CPE" except the function is performed multiple times corresponding to the number of Directory Numbers in the specified list.

As indicated earlier, broadcast of the information string to various CPE indicated in the switch memory may take place at various times. Those times may be specified by the ESP (time of Day) or may occur as switch resources become available.

Figure 14:
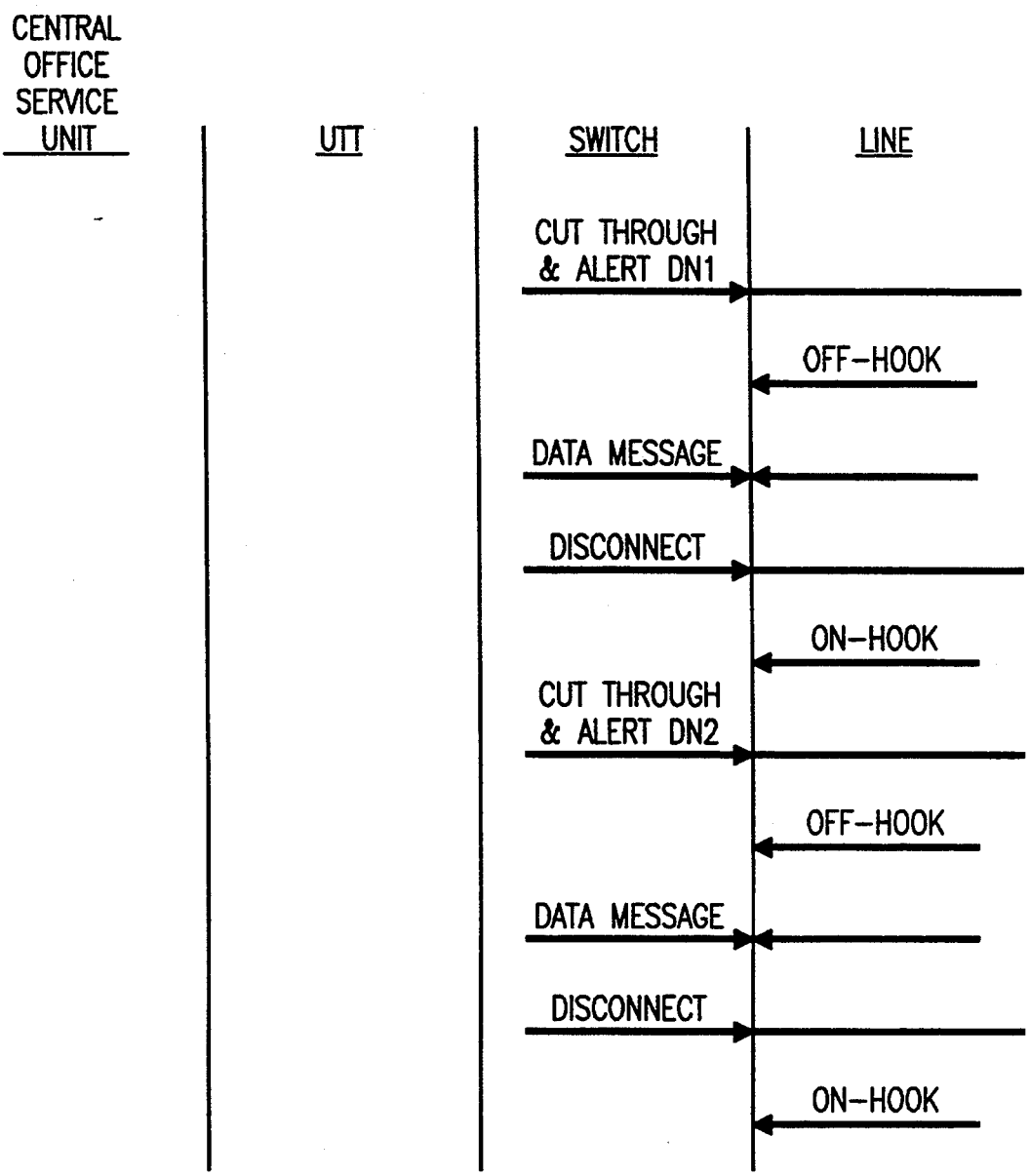

Refer to FIG. 14. In this example, the switch initiates the broadcast process due to an ESP or internally generated request. The switch cuts through to the first Directory Number in the list to be connected to. Abbreviated ringing is sent, if indicated in the list of DN's to call. The line is alerted, and a subaddress is sent. When an Off-Hook is received, the broadcast message is sent to the CPE. At the conclusion of the broadcast message, a Disconnect is sent to the CPE to clear the line. The CPE goes On-Hook. This cut through, alert and subaddress process is repeated until the broadcast list of DN's is exhausted.

If a Directory Number is Busy, the switch will retry to deliver the broadcast message X times before reporting a delivery failure to the ESP. Call Waiting can be a final attempt to deliver the message before delivery failure is recorded in memory. Delivery failure will be reported to the ESP by groups and not as individual Directory Numbers.

If the end user has Call Waiting assigned to the line, the telemetry call will not activate Call Waiting or Caller ID on Call Waiting (CIDCW).

A Barge-In case is provided which allows the ESP to Barge-In on an existing conversation.

7. Utility/ESP Notification of Broadcast Success or Failure

The broadcast function requires an identification to the COSU/ESP of the success or failure to deliver the information message.

The protocol for this example is:
KP+TFI+ANI+ST(ST', ST'', ST''')
KP+MM+ST(ST', ST'', ST''')
KP+NNNN+ST
where:

TFI = Alert Function Subaddress (see Tables 1 and 2)
= 00 006 00

Alert:=00 indicates no alert is sent by the switch. In the switch to COSU direction, alert is an Off-Hook signal.

Function=006 indicates the information contained in the third information string (NNNN) is the status of the broadcast message.

Subaddress=00 indicates there are no subaddresses. For broadcast status applications, the subaddress is contained with the broadcast list of Directory Numbers being reported in the information string NNNN.

MM=indicates the broadcast list identifier. For example, 01 would identify list 1 and 02 would identify list 2.

NNNN=An information string, either binary or text information, to be reported for each Directory Number contained in list MM.

An example of such a list is:

[Success: DN 1, Subadd 4, DN 3, Subadd 1; Failure: DN 2, Subadd 1]

This report can take a variety of forms.

Figure 15:
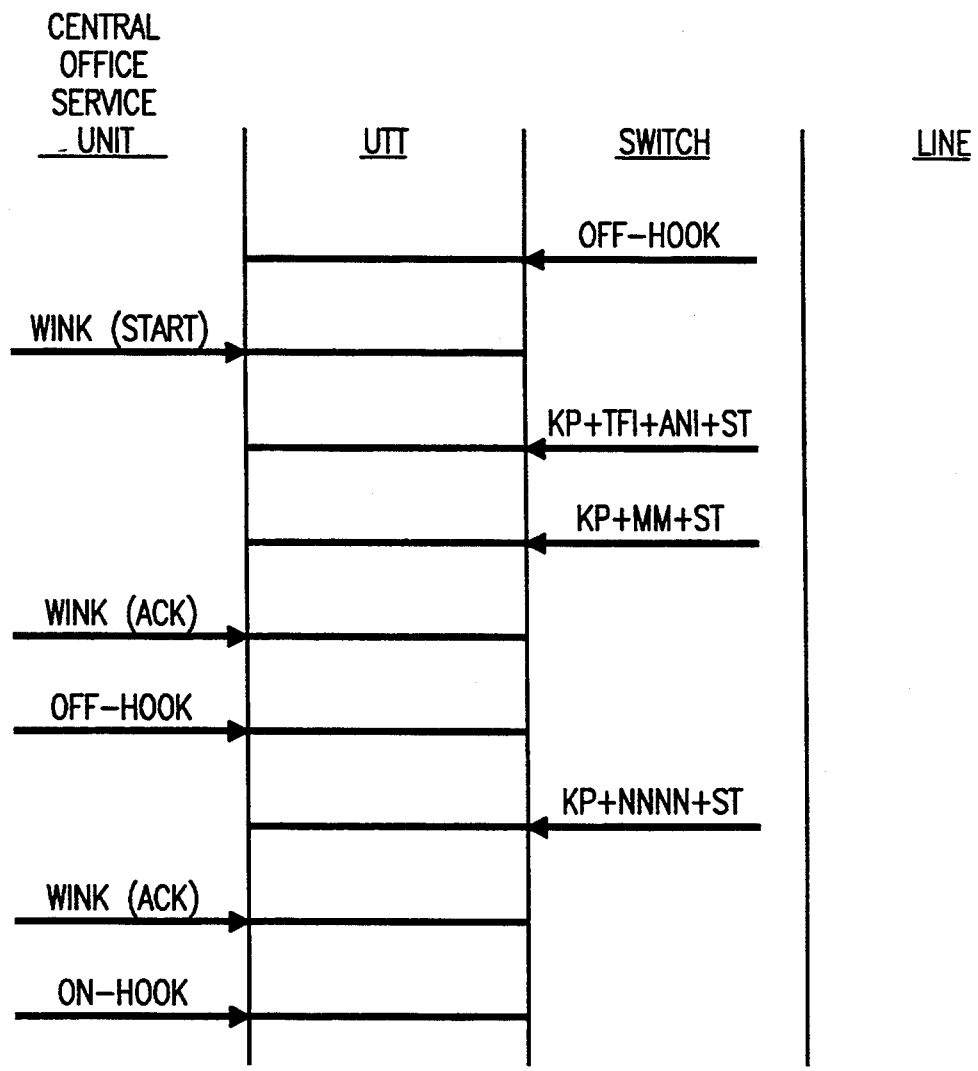

Refer to FIG. 15. For this application, the switch initiates a UTT connection to the COSU by going Off-Hook. The COSU responds with a Wink (start). The switch sends the two strings of information which are acknowledged by a Wink (ACK). The COSU sends an Off-Hook to the switch. The switch then sends to the COSU the third information string. The COSU responds to the switch with a Wink (Ack) and On-Hook. The switch responds with an On-Hook to the COSU.

8. Utility/ESP Request Broadcast Status

The COSU/ESP also requires a method to request from the switch a status of the broadcast command.

In response to this request for status, example 7 "ESP notification of Broadcast Success or Failure" would be sent to the COSU/ESP.

The protocol for this example is:
KP+TFI+ANI+ST(ST', ST'', ST''')
KP+MM+ST(ST', ST'', ST''')
where:

TFI = Alert Function Subaddress (see Tables 1 and 2)
    = 00  007  00

Alert=00 indicates no alert is sent by the switch.

Function=007 indicates a broadcast status report is requested for broadcast list MM.

Subaddress=00 indicates there are no subaddresses.

MM=indicates the broadcast list identifier. For example, 01 would identify list 1 and 02 would identify list 2.

Figure 16:
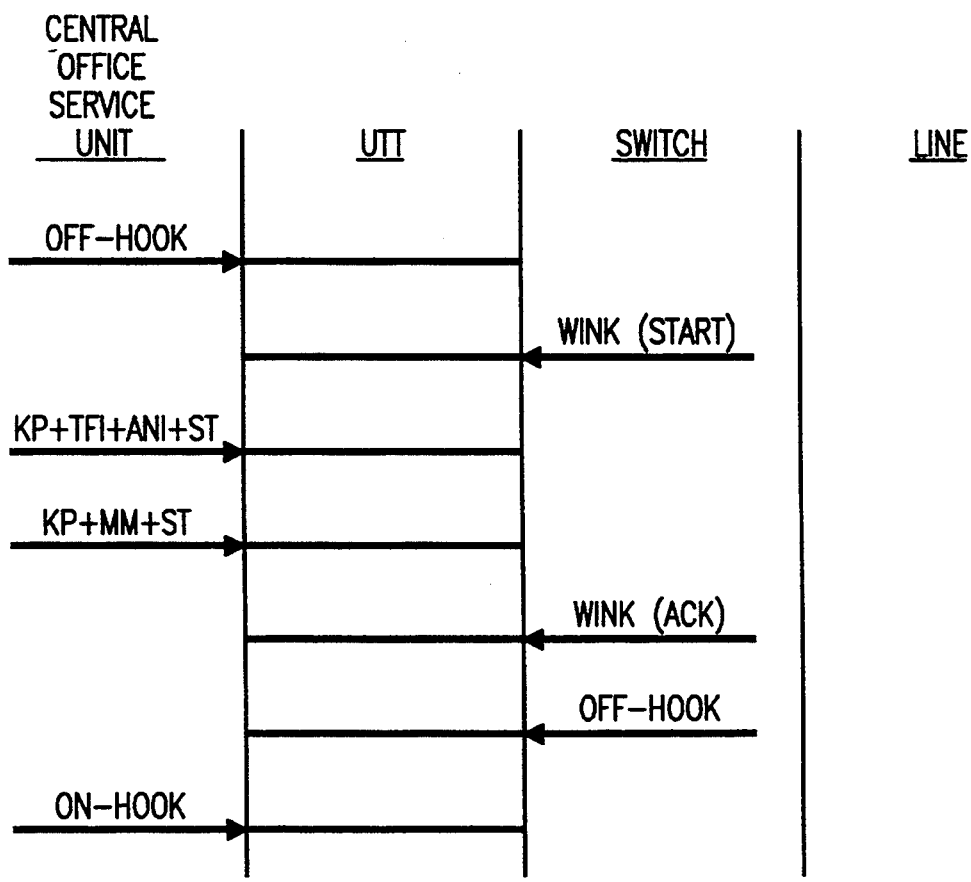

Refer to FIG. 16. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch responds with a Wink (ACK) and Off-Hook. The COSU completes the protocol by sending the switch an On-Hook signal.

9. Broadcast to CPE—Information to Switch (ADSI type CPE)

This and the following example identifies how the switch is instructed to broadcast a given message (text or data) to CPE and interact with additional switch capabilities to complete the call. This example instructs the switch to broadcast a message to an identified list.

In this example, the telemetry feature, after providing the connection, CPE On-Hook alerting signal and subaddress to the CPE, gives line side control to the ADSI capability. The ADSI capability provides the ADSI alert. The message is delivered to the ADSI CPE. This is similar to example 3. The list of Directory Numbers, alert codes, and subaddresses has previously been stored in the switch memory. The third information string, in this protocol transaction, contains the information to be broadcast to each Directory Number. The information in the third string may also contain a time of day to broadcast the message or a priority rank of this information over other broadcast strings.

The protocol for this example is:
KP+TFI+ANI+ST(ST', ST'', ST''')
KP+MM+ST(ST', ST'', ST''')
KP+NNNN+ST
where:

TFI = Alert Function Subaddress (see Tables 1 and 2)
    = 00  005  00

Alert=00 indicates no alert is sent by the switch. For broadcast applications, the alert code is contained in the broadcast list of Directory Numbers in the switch memory.

Function=005 indicates that the information contained in the third information string (NNNN) is to be considered the information to be transmitted to the CPE.

Subaddress=00 indicates there are no subaddresses to be sent to the CPE. For broadcast applications, the subaddress is contained in the broadcast list of Directory Numbers in the switch memory.

MM=indicates the broadcast list identifier. For example, 01 would identify list 1 and 02 would identify list 2.

NNNN=An information string, either binary or text information, to be broadcast to each Directory Number in list MM. An example of such a list is:

["Your requested feature, Call Blocking, has been installed for your use as of 10:30 AM today, May 3, 1993"]

["Repair service has completed scheduled repairs to your telephone line. Thank you for using - - -"]

The data string may contain a time of day to broadcast the message or a priority code indicating the priority of this broadcast compared to other broadcast strings. This may be used for switch considerations or emergency notification conditions.

Figure 17:
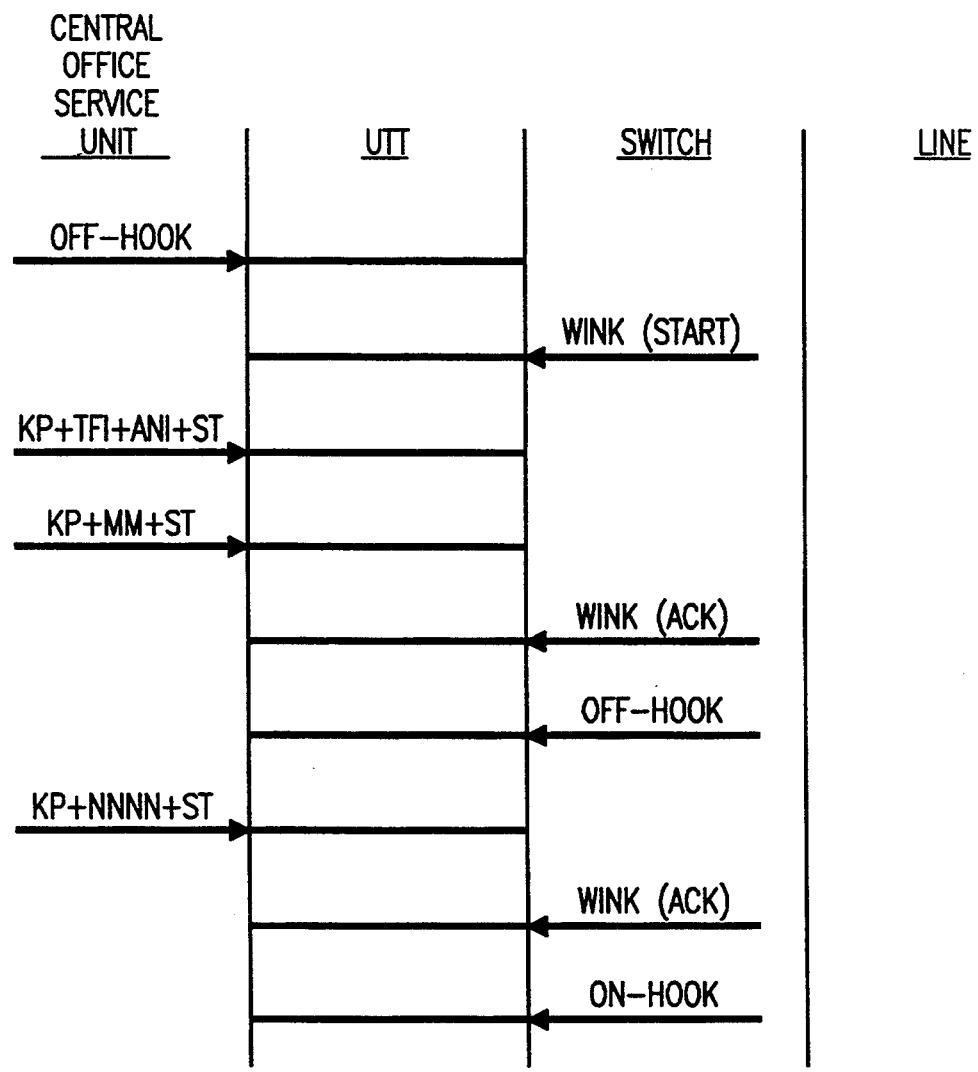

Refer to FIG. 17. For this application, the utility/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The COSU sends the switch the third information string. The switch acknowledges the third information string with a Wink (ACK) and an On-Hook. The COSU returns On-Hook to complete the signaling protocol.

10. Broadcast to CPE—Connect to CPE (ADSI type CPE)

This example identifies how the switch performs the actual broadcast function.

The broadcast of information is similar to example 3 "ESP data to CPE" except the function is performed multiple times corresponding to the number of Directory Numbers in the specified list. As indicated earlier, broadcast of the information string to various CPE indicated in the switch memory may take place at various times. Those times may be specified by the ESP (time of Day) or may occur as switch resources become available.

In this example, broadcast to ADSI CPE requires the interaction of the telemetry feature and the ADSI feature to complete the call. The telemetry feature, after providing the connection, CPE On-Hook alerting signal and subaddress to the CPE, gives line side control to the ADSI capability. The ADSI capability provides the ADSI alert. The message is delivered to the ADSI CPE. Control is then returned to the telemetry feature to deliver another ADSI message. This iterative process is continued until all Directory Numbers have been accessed or sufficient connect tries have been made to the CPE.

Figure 18:
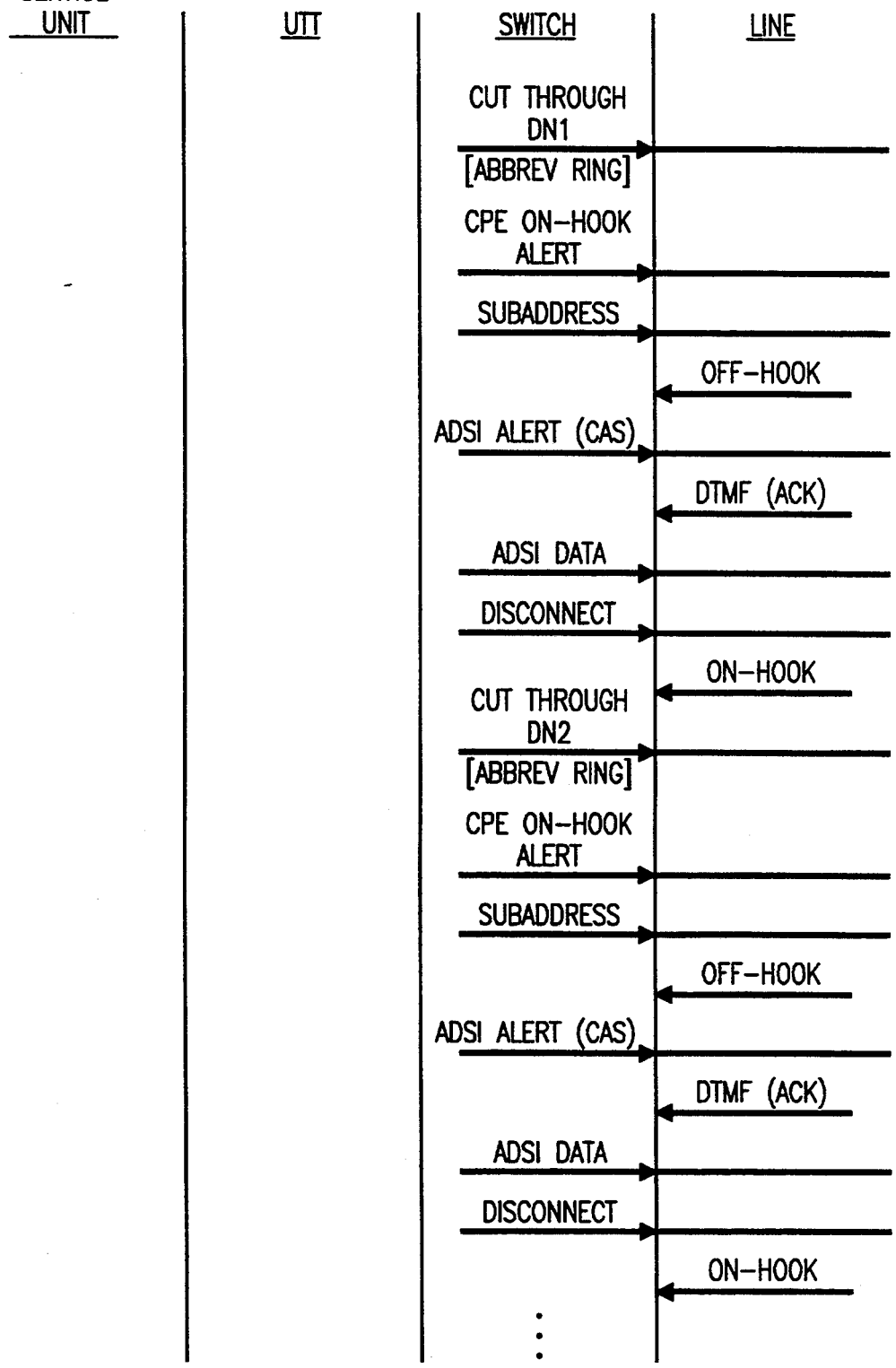

Refer to FIG. 18. In this example, the switch initiates the broadcast process due to an ESP or internally generated request. The switch cuts through to the first Directory Number in the list to be connected to. Abbreviated ringing is sent, if indicated in the list of DN's to call. The line is sent the CPE On-Hook alert signal and subaddress. When an Off-Hook is received, the ADSI alert (CAS) is sent to the CPE. A DTMF (ACK) is received from the ADSI CPE. The ADSI message is sent to the ADSI CPE. At the conclusion of the ADSI broadcast message, a Disconnect is sent to the CPE to clear the line. The CPE goes On-Hook. This cut through, CPE On-Hook alert, subaddress, ADSI alert signal, receipt of DTFM (ACK), ADSI data to CPE, and Disconnect process is repeated until the broadcast list of DN's is exhausted.

If a Directory Number is Busy, the switch will retry to deliver the broadcast message X times before reporting a delivery failure to the ESP. Call Waiting can be a final attempt to deliver the message before noting the delivery failure in memory. Delivery failure will be reported to the ESP by groups and not as individual Directory Numbers.

If the end user has Call Waiting assigned to the line, the telemetry call will not activate Call Waiting but will retry the Directory Number again at a later time.

A Barge-In case is provided which allows the ESP to Barge-In on an existing conversation.

11. Voice Message to CPE

This example is similar to the second example except the switch provides a power ring alert and subaddressing in the silent interval of the ringing signal. When the CPE goes Off-Hook, the switch indicates Off-Hook to the COSU.

Applications for this technique are delivery of voice messages directly analogous to delivery of telemetry data. ESP's will be capable of delivering voice messages even if their clients have their calls forwarded to another destination. Since the switch has control of the CPE alert function and subaddress, the switch can internally initiate calls for such things as broadcast to various voice message devices, Operations Systems testing of CPE, Operations Systems or service order initiated changes to CPE, or other switch initiated communications functions with voice message confirmation.

The protocol for this example is:
KP+TFI+ANI+ST(ST', ST", ST''')
KP+DN+ST(ST', ST', ST''')
Voice Message
where:

TFI = Alert Function Subaddress (see Tables 1 and 2)
  = 01  008  05

Figure 19:
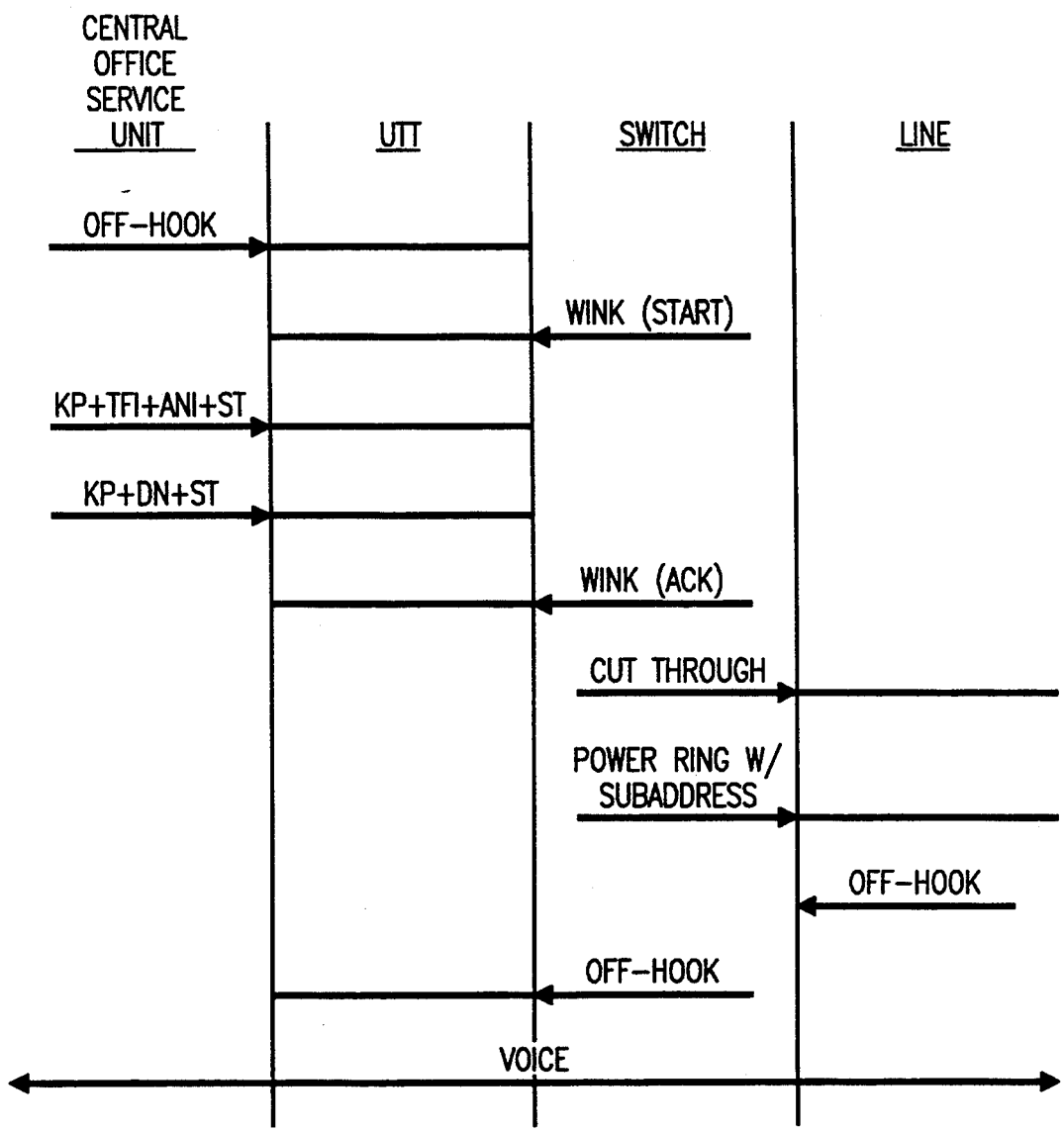

Alert=01 indicates the switch is to send a power ringing signal to the line.
Function=008 indicates that, if the CPE is On-Hook, the switch is to power ring the CPE based on the alert signal defined above, the switch is to return Busy if the line is Busy, an Off-Hook is to be returned from the CPE after it is alerted and the subaddress received, and there is no third information string.
Subaddress=05 indicates a subaddress of 5 will be sent to the CPE in the silent interval of ringing (indicating, for example, extension 5 at the specified Directory Number). Upon receiving the subaddress the CPE (at subaddress 5) will go Off-Hook.
ST (first string)=indicates only two subaddress digits are present Refer to FIG. 19. For this application, the utility-/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch cuts through to the end user's line, sending abbreviated ringing, if instructed. The switch then sends power ringing and the subaddress in the silent interval of power ringing. If the CPE device is present (answering machine) or the end user picks up the CPE, the CPE goes Off-Hook. The switch returns Off-Hook to the COSU. The COSU and CPE exchange data.

If the CPE is already Off-Hook, Busy will be returned to the COSU since there is no knowledge as to which CPE subaddress is Off-Hook. Rather than provide a false indication of the correct device being Off-Hook, a Busy is returned.

After the switch returns Off-Hook to the COSU, data is exchanged between the ESP and CPE.

If the end user has Call Waiting assigned to the line, the telemetry call will not activate Call Waiting or Caller ID on Call Waiting (CIDCW).

A Barge-In case is provided which allows the ESP to barge-in on existing conversations.

12. Voice Message Broadcast to CPE—Information to Switch

This and the following example identifies how the switch is instructed to broadcast a voice message to CPE. This example instructs the switch to broadcast a voice message to an identified list. The list of Directory Numbers, alert codes, and subaddresses has already been stored in the switch memory. The voice information is communicated to the switch after the second protocol string. The voice message is stored in the switch (or auxiliary devices) until the switch is ready to broadcast the voice message to each directory number. A third protocol string may be implemented to communicate to the switch information for a time of day to broadcast the message or a priority rank of this information over other broadcast strings. This time of day information is not illustrated here and would require the assignment of another TFI function code to identify there is another protocol string present. The broadcast time element may be used for switch loading (traffic) constraints or emergency notification conditions.

The protocol for this example is:
KP+TFI+ANI+ST(ST', ST", ST''')
KP+MM+ST(ST', ST", ST''')
Voice Message
where:

TFI = Alert Function Subaddress (see chart 1 and 2)
= 00 009 00

Alert=00 indicates no alert is sent by the switch. For broadcast applications, the alert code is contained in the broadcast list of Directory Numbers in the switch memory.

Function=009 indicates that the voice information sent after the second protocol string is the information to be transmitted to the CPE.

Subaddress=00 indicates there are no subaddresses to be sent to the CPE. For broadcast applications, the subaddress is contained in the broadcast list of Directory Numbers in the switch memory.

MM=indicates the broadcast list identifier. For example, 01 would identify list 1 and 02 would identify list 2.

An example of a voice message to CPE is:
["Your air conditioner has been turned off and will be restored at 11:00 AM"]

The broadcast function requires an identification to the COSU/ESP of the success or failure to deliver the information message and a method to request a status of the broadcast command from the switch.

Figure 20:
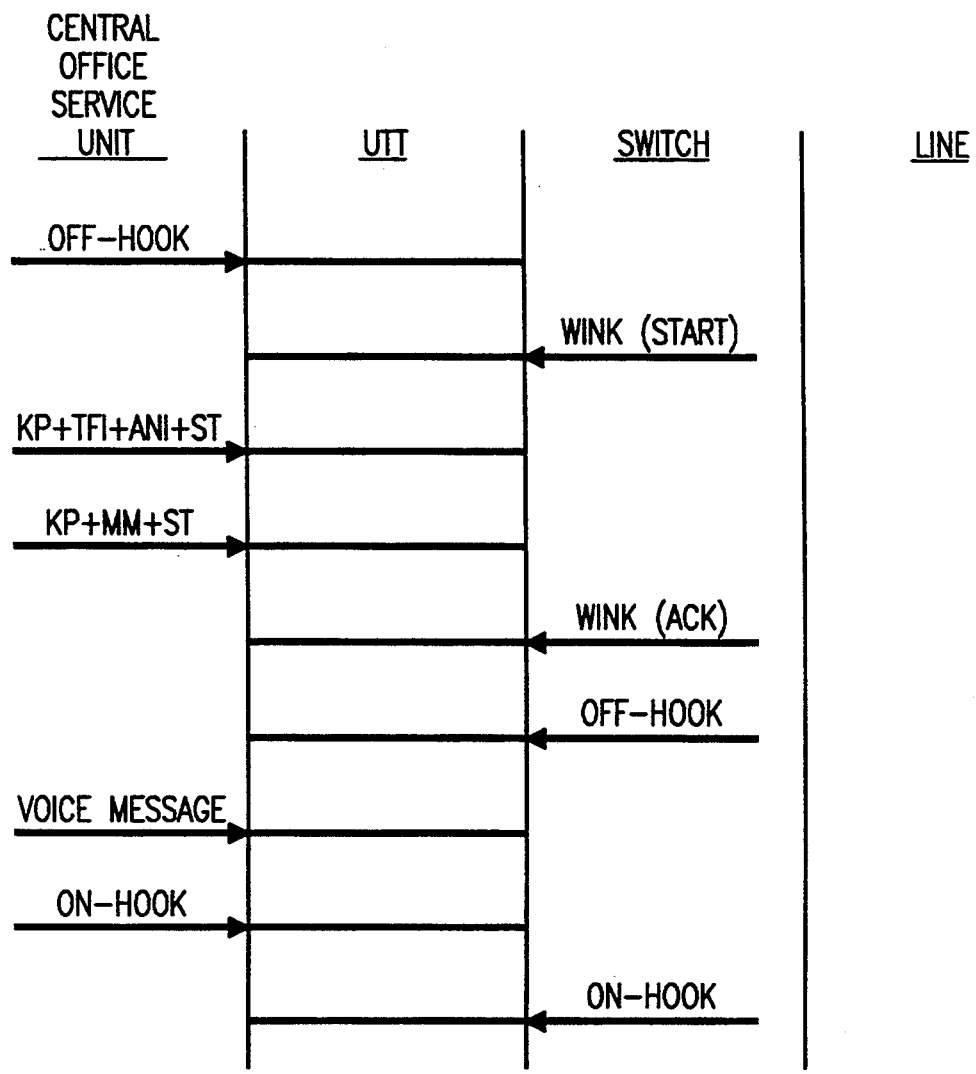

Refer to FIG. 20. For this application, the utility-/ESP connects to the COSU using a variety of connection means. The COSU initiates a UTT connection to the switch by going Off-Hook. The switch responds with a Wink (start). The COSU sends the two strings of information which are acknowledged by a Wink (ACK). The switch also sends an Off-Hook. The ESP-/COSU send a voice message to the switch. This information is stored in the switch memory or some other auxiliary device. The call is terminated by the COSU sending On-Hook to the switch. The switch sends On-Hook to the COSU to complete the protocol.

13. Voice Message Broadcast to CPE—Connect to CPE

This example identifies how the switch performs the actual voice message broadcast function.

The broadcast of information to the CPE is similar to the previous broadcast example. The voice message delivery to CPE function is performed multiple times corresponding to the number of Directory Numbers in the specified list.

As indicated earlier, broadcast of the voice information to various CPE indicated in the switch memory may take place at various times. Those times may be specified by the ESP (time of Day) or may occur as switch resources become available.

Figure 21:
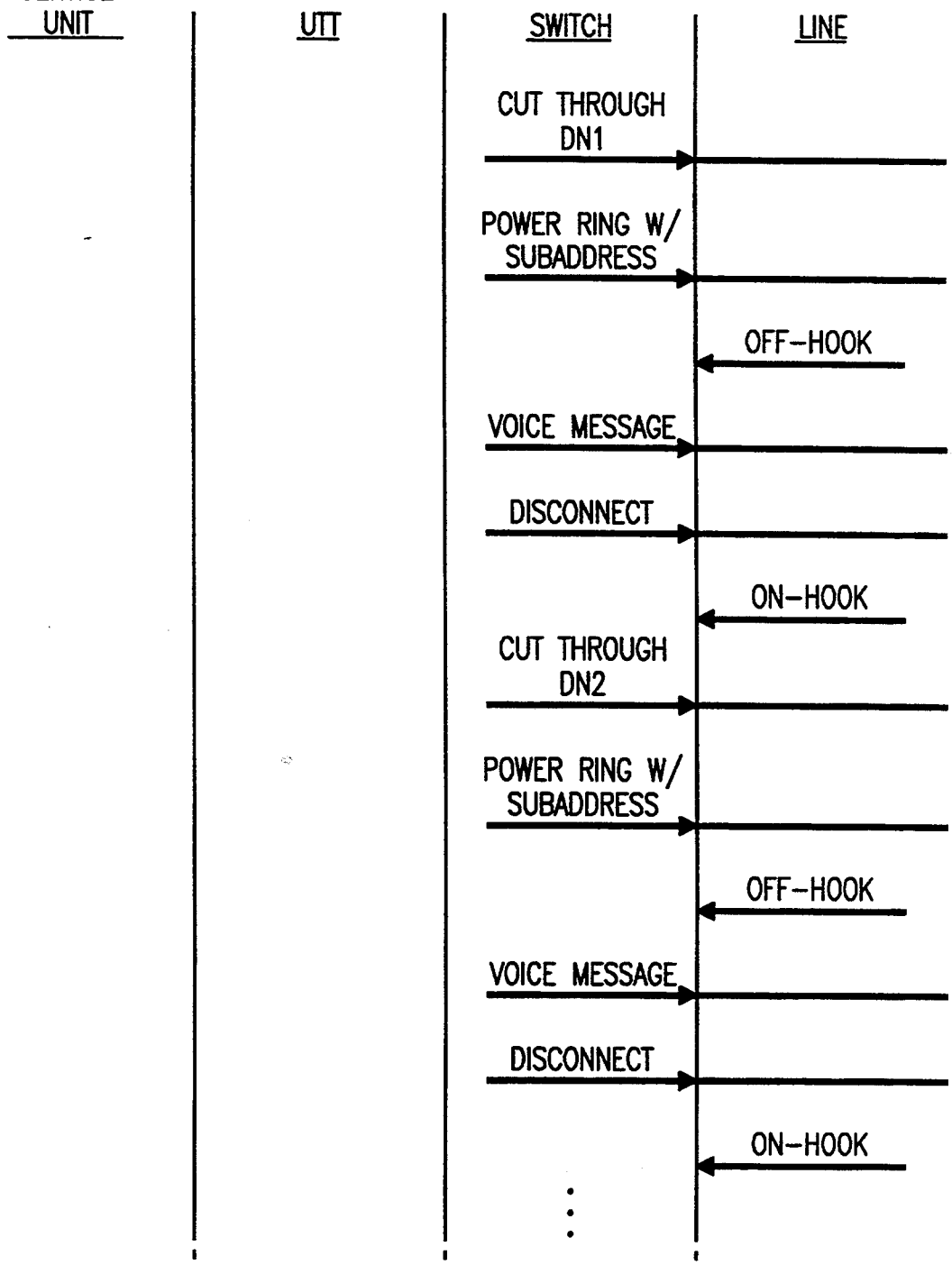

Refer to FIG. 21. In this example, the switch initiates the broadcast process due to an ESP or internally generated request. The switch cuts through to the first Directory Number in the list to be connected to. Power ringing is sent to the CPE with the subaddress in the silent interval. When an Off-Hook is received, the voice broadcast message is sent to the CPE. At the conclusion of the broadcast message, a Disconnect is sent to the CPE to clear the line. The CPE goes On-Hook. This cut through, power ring and subaddress process is repeated until the broadcast list of DN's is exhausted.

If a Directory Number is Busy, the switch will retry to deliver the broadcast message X times before reporting a delivery failure to the ESP. Call Waiting can be a final attempt to deliver the message before delivery failure is recorded in memory. Delivery failure will be reported to the ESP by groups and not as individual Directory Numbers.

If the end user has Call Waiting assigned to the line, the telemetry call will not activate Call Waiting or Caller ID on Call Waiting (CIDCW).

A Barge-In case is provided which allows the ESP to Barge-In on an existing conversation.

PRIOR ART

There has long been a need for reading utility meters periodically, a need which in the past has been met largely through manual arrangements. More recently, there has also been a growing desire by the electric power utilities to be able to control consumer electric loads as a means of forestalling brownout and blackout situations. This need has been met with only partial success in the prior art by telemetering arrangements associated with telephone customer line access and by the use of carrier systems connected to power distribution lines. In these arrangements, utility meters at a telephone customer's home or business are accessed via the telephone customer's line when that line is not being used for telephone calls. The method of accessing the line is to have a direct metallic path between the customer's meter reading interface and a service unit at the central office for monitoring and controlling the off-hook/on-hook supervisory state of the customer. Access from the central office switch to the customer is provided through the use of a no-test trunk, i.e., a trunk which can access a customer's line even when that line is already in the off-hook state. The trunk uses a no-test connection, i.e., a special metallic connection that bypasses the normal switched telephone connection and connects without making a busy test. This metallic connection passes direct current signal. The no-test trunk is used to get access to the meters without ringing the customer's line, the latter action being performed on all conventional telephone connections. The meter is then triggered to respond by being sent signals over the no-test connection, each signal consisting of a burst of tone of one of thirteen frequencies in the telephone voice band. Using this arrangement, a connection is established to the customer's line, the service unit makes a test whether the customer is busy, and, if the customer is not busy, the service unit is connected to the customer's meter interface. The meter interface is primed (alerted) by one of the thirteen frequencies to respond to data signals originating from the service unit or a controller at the utility, transmitted via the service unit. These data signals may be either in the form of dual tone multifrequency (DTMF) signals or frequency shift keyed binary data signals. Following the alerting of the meter interface unit, there is an exchange of signaling information between the controller and the meter interface unit, the signaling exchange being used for triggering the reading of meters, for transmitting the present reading of the meters, for returning the present status of these meters, or for controlling a device such as an air conditioner at the called customer's residential or business location. The latter function allows a power company to control its peak load by temporarily shutting down, possibly on a rotating basis, a portion of the air conditioners being served. The actual reading of the meters is performed by a reading mechanism that interfaces with the meter interface used. Meter status information includes indications of customer tampering, low battery, or other indications of a need for servicing. After a complete cycle of meter readings and/or device control operations has been completed, the no-test connection is dropped and the customer is enabled to originate new calls.

While the customer's line is connected to the service unit, supervision of the customer's line is performed by the central office service unit (C.O. service unit) which is connected by a metallic access connection that provides current sensing supervision from a central office service unit. In modern digital switching systems, such as the 5ESS® switch manufactured by AT&T, and described in *The AT&T Technical Journal,* July/August 1985, no metallic access connection is provided through the voice network, so that a no-test trunk is required for monitoring direct current supervisory signals. If the customer's telephone station goes off-hook, a direct current in excess of 20 milliamperes is detected by the C.O. service unit and the central office service unit disconnects the telemetry call. In some cases, the supervision is performed from the customer's meter interface unit which transmits a disconnect signal to the central office service unit to disconnect the telemetry call.

There are a number of disadvantages to this arrangement. The no-test trunk is a facility available in very small numbers in a central office, the number being limited by the no-test access arrangements. No-test trunks are used primarily for checking on customers whose lines are reported as being busy for too long a time, making tests of the resistance between the two wires of a customer line, and manual testing of a line. In a typical switch, such as the 5ESS switch, only two no-test trunks are available in an entire switch, which may serve up to several hundred thousand customer lines. In a typical meter reading cycle the time required for meter readings and/or device control operations may vary from 10 to 20 seconds. Clearly, two no-test trunks are inadequate to serve the meter reading and device control needs of all the customers of the 5ESS switch. Further, the requirement for a direct metallic path in order to provide current sensing supervision makes it difficult to access lines which are not connected directly to a switch but are connected through a subscriber line carrier system, such as the SLC 96 (Subscriber Line Carder) manufactured by AT&T, since such SLC systems do not provide a metallic path for a normal voice connection. Further, billing records for such no-test trunk calls are made separately from the billing records for voice or data calls, thus creating administrative problems. Further, in prior art arrangements, if a customer wishes to originate a call while the meter reading is taking place, there are some arrangements in which the customer is blocked until the reading is completed and other arrangements in which the customer is blocked for a period of 1 to 2 seconds until the no-test connection can be dropped.

Because of the small number of no-test trunks and limited no-test access, and the fact that the no-test trunks are needed for their primary intended purposes, the number of meters which may be monitored and devices which may be controlled is much smaller than the number of such meters and devices served by a typical large local central office. It is costly to add substantial numbers of extra no-test trunks, in a digital switch such as the 5ESS switch which does not provide a metallic access voice switching network, because the metallic access unit provided for such no-test trunks is expensive. A problem of the prior art, therefore, is that there is no arrangement available which permits a large central office, especially a digital central office which does not provide a direct metallic path for telephone connections, to access a large number of meter reading and device control interfaces within a reasonable period over the customer lines connecting that central office to the telephone stations and the remote metering devices.

The above problem is solved by providing, for example, arrangements wherein a standard interoffice trunk, controllable by special software of the connected switching system, is used for accessing, over an analog customer line, a customer's premises device such as a meter interface unit (MIU) from a data access device, such as a utility meter reader/device controller; this standard trunk is then connectable to the customer's line via a suppressed ringing connection through the communication signal switching network, used, for example, for voice signals, in order to access the customer's analog line, connected to the MIU. Advantageously, such an arrangement makes it possible to use a plurality of circuits for accessing different meter interface units at the same time and without requiring additional expensive specialized no-test trunks.

Modern digital switching systems, such as the 5ESS switch, do not provide a metallic connection that can pass direct current signals; metallic access facilities are expensive in digital switches because they bypass the digital network which is used for passing speech signals for telephone conversations. The switching network need not provide a metallic access from the C.O. service unit to the line because supervision is detected at the line circuit, an interface between the switching network and the customer line, and is passed by the software controlled processors of the switch to the connected trunk, which passes supervision to the C.O. service unit. Trunks such as the well-known E & M trunks or trunks using common channel signaling have arrangements for communicating a change in supervisory state at one end to the other end of the trunk. These arrangements are used to transmit customer supervisory state changes to the C.O. service unit so that the unit may disconnect if a customer goes off-hook.

In the past, the only way of getting access to a customer's line using the standard switching network or switch fabric was to ring the customer's line, and to monitor supervision from a line circuit in the switch. In a departure, a new type of call connection is made in which ringing is suppressed in order to avoid alerting the customer; supervision is monitored by the switch and transmitted via the software controlled processors and trunk supervisory signal transport techniques to a monitoring central office unit. The meter interface unit is alerted without ringing the customer's line from a connection through the standard switch fabric of the central office by providing a new class of service for calls from the utility, the new class of service being characterized by a connection made without such ringing. In this case, the class of service is a class of service of the caller and affects the nature of the call being set up. The meter interface unit is alerted that a connection to the meter interface is desired by a tone sent to the interface unit by the C.O. service unit, or, alternatively, by the utility controller through the service unit. The interface unit receives these tones while in the on-hook state and processes them without sending an off-hook signal back to the central office.

Billing records are made in the normal way that billing records are made for calls through the switching network. Advantageously, this type of call connection can use the normal switch fabric for accessing a customer line, while also providing the absence of ringing necessary to access the meter interface unit without disturbing the customer, and while continuing to use normal customer supervision from the switch.

Present-day subscriber line carriers (SLCs) will not set up a connection unless they detect ringing. An exception to this rule is for a connection from a no-test trunk wherein a special tone is provided which is recognized by the subscriber line carrier and which will then provide a metallic bypass of the SLC. In accordance with one aspect of the invention, when a meter interface unit access call is set up through a subscriber line carrier, a brief burst of ringing is applied on that connection. In response to that brief burst of ringing, the subscriber line carrier sets up a connection within its own switch fabric to the called customer whose meter interface unit is being accessed. The burst of ringing is sufficiently short that the subscriber line carrier which repeats any ringing signals that it detects on its input, will not in fact repeat any ringing signal to that customer's line, thus, avoiding disturbing the customer when only the meter interface unit is being accessed.

A central office service unit interfaces between a utility controller, such as a personal computer, at the utility and the meter interface unit connected through the voice signal switching network. Responsive to signals from the utility controller, the central office service unit signals the switch with the identification of the called customer to set up a suppressed tinging connection to the desired meter interface unit. The central office service unit or utility controller transmits alerting signals to the meter interface unit. The central office service unit detects off-hook signals from the switch in order to signal for a premature disconnect, and responds to a meter interface unit disconnect signal to signal the switch for a disconnect of the meter reading and/or device control connection. The central office service unit has a plurality of interoffice trunks for communicating with customers connected to other switching systems and for communicating simultaneously for reading several meters in parallel for customers in these switching systems; it also is connectable to a plurality of utilities for simultaneous use over different trunks.

In accordance with one aspect of the invention, for an Integrated Services Digital Network (ISDN) station connected via a Primary Rate Interface or a Basic Rate Interface, and a digital line, the D-channel is used for communicating with the meters and controllable devices. This also permits the communication signal switching network to be used for providing access to the customer's lines and allows the high bandwidth (64 or 16 kb./sec.) D-channel to be utilized for communications with the meters and devices. Here, supervision is detected at the customer premises and is transmitted by data signals over the D-channel.

Refer to FIG. 1. A terminal such as a personal computer 10 at the office of a utility is connected by a line or connected over an interoffice trunk to a telephone switch 21. When an access number is dialed and received from PC 10 in switch 21, a connection is set up to a central office service unit 20. The central service unit is located herein in a first central office that includes switching system (switch) 21. In alternative arrangements, the central office service unit disconnects PC 10 and dials back to access PC 10 in order to guard against tampering of the meter reading and device control process from unauthorized sources. This central office (C.O.) service unit 20 is connected to a plurality of central office switches, such as switch 21 and 22 by utility telemetering trunks which are simple interoffice trunks. Each of the switches 21 and 22, which may be housed in different wire centers, has a switching network, 23 and 24, respectively, for transmitting communications signals, such as voice signals, and including the meter reading and device control signals of this invention. Each of the switches comprises control processor means 26, operative under the control of a program 28, stored in memory 27 for controlling the operations of the switch. In response to signals received from PC 10, C.O. service unit 20 requests utility connections by sending signals similar to the kinds of signals sent for setting up an interoffice call to the appropriate one of switches 21 or 22.

In this specific embodiment, the method used for signaling the request to be connected via a customer line to a particular metering interface unit (MIU) such as MIU 30, MIU 32 or MIU 35 is to send out a string of multifrequency (MF) digits. Such a string of digits usually consists of a key pulse signal (KP), a four, five, seven or ten digit directory number and a start (ST) signal. In response to reception of these digits, a switch such as switch 21 translates the received directory number to identify a meter interface unit such as meter interface unit 30 and sets up a connection via a utility telemetry trunk (UTT), between the central office service unit 20, through a switching network 23 or 24, via a customer line to a MIU 30, 32 or 35.

The utility telemetry trunk has a special class of service which identifies to the connected switch that the requested connection is to be made with ringing suppressed. In response to a received directory number from a UTT, switch 21 sets up a connection with tinging suppressed to MIU 30. Note that a suppressed tinging connection differs from a conventional voice connection, not only in that a ringing signal is not sent and that the line is not monitored for a supervisory signal to stop or "trip" ringing, but that no check is made that a tinging signal is actually flowing to the analog line. The tinging signal and its accompanying checks are a basic and inherent part of any normal telephone connection. For example, even when a facsimile call is completed, wherein no audible bell is heard, the circuits of the terminating facsimile machine respond to the tinging signal that is sent from the switch.

When the suppressed tinging connection to the MIU has been established, MIU 30 is connected to C.O. service unit 20 and receives from that service unit or from PC 10 through the service unit an alert tone to trigger the MIU into the telemetry mode. In accordance with the principles of this invention, wherein a customers station equipment includes both a voice or other communication station and an MIU, the normal ringing signal alerts the communication station, and, where this is a voice station, thereby alerts the customer, while the tone signal sent over the suppressed ringing connection alerts the MIU. Telemetry and control signals are then exchanged between C.O. service unit 20 or utility controller 10 and MIU 30 and the data received from MIU 30 is transmitted from C.O. service unit 20 to PC 10 for processing by the utility. Similarly, utility control signals are sent from PC 10 to C.O. service unit 20 for transmission to MIU 30 to control devices at the customer's home. If a customer picks up the handset of a telephone station while the communication between the service unit and the meters and/or devices at the customer's location is in progress, these communications are quickly terminated and regular service restored to the customer. An incoming call, however, will receive a busy signal if a utility access call is in progress.

The UTT is a conventional interoffice trunk such as an E & M trunk or a common channel signaling trunk. Such trunks have arrangements whereby a change of supervision at one end is signaled to the other end by a tone (E & M) or by an out of band tone or data signal. Such a trunk passes a supervisory signal, detected at a line circuit and passed by the switch processor to one end of the trunk, to the C.O. service unit to effect a disconnect of that unit when a customer goes off-hook in the middle of a utility access call.

The C.O. service unit is expanded from prior art C.O. service units to be connected by trunks to a plurality of switches, such as switch 21, . . . ,22, and is connectable by a plurality of trunks (a trunk group) to each such switch. In some cases, several trunk groups may be connected to one switch, for example, to handle traffic to different groups of SLCs. The C.O. service unit is also connected to a plurality of utilities, only one of which is shown, which simultaneously establish calls to different customers.

While in this embodiment, the utility access unit PC 10 is connected to the MIU through a service unit, an alternate configuration would permit a utility access unit to be connected via a trunk directly to the switching network for connection to the MIU.

The specific embodiment of FIG. 1 uses an analog line, transmitting voice band signals, ringing or tone alerting signals, and using direct current detection of supervision. The term "ringing" as used herein is used for convenience and because of its common use, but is meant to describe any process of customer alerting, including, for example customer tone alerting. For Integrated Services Digital Network (ISDN) lines, supervision and customer alerting signals are transmitted as data signals over the D-channel of the customer line.

FIG. 1 shows details of a meter interface unit. A protection circuit 40 is used to protect the rest of the meter interface unit 30 against damage caused by electrical signals carrying excessively high energy. Effectively, this is over-voltage protection. Such protection circuits are well known in the prior art. Alert circuit 42 is used to detect the initial alerting tones used for signaling a request for a connection to the meter interface communication circuit 46. The alert circuit continuously monitors the line when the line is on-hook in order to detect such signals. When such signals are detected, it activates the meter interface communication circuit which communicates with PC 10 to exchange the reading information from meters and the control information on meters 50 and the control information for controlling devices 48. When a control and/or reading cycle has been completed as determined by the C.O. service unit 20, the C.O. service unit goes on-hook which triggers switch 21 to send a 300 millisecond minimum open loop signal to the MIU to signal a disconnect.

In some cases, certain SLCs such as AT&T's SLC 96 will not transmit a forward disconnect (open). In many cases it will. It depends on the channel units installed. If the disconnect is not forwarded, then the MIU detects the end of data transmission and notifies the C.O. service unit during the data transmission, and the C.O. service unit detects the end of data transmission and disconnects to connecting trunk. Depending on the channel unit inventory situation, the telephone service supplier may wish to allow off-hook transmission. In this case, the MIU detects the end user off-hook signal in order to signal for a disconnect of the suppressed tinging connection. In any case, it is to provide the forward disconnect through the appropriate channel units.

As long as the meter interface unit 30 presents an impedance in excess of approximately 10 k ohms to the line, the central office will treat the line as being on-hook. If the customer should pick up his telephone instrument while the communication between the PC and the meter interface unit is going on, switch 21 will detect the off-hook and cause the communication between the PC and the meter interface unit to be aborted by sending a disconnect signal to the MIU and an on-hook signal to the C.O. service unit to terminate the connection.

Arrangements for communicating with on-hook devices such as the meter interface unit 30 are well known in the prior art and are defined, for example, in *Bellcore Technical Reference TR-TSY-000030*, Issue 1, June, 1988.

Figure 2:
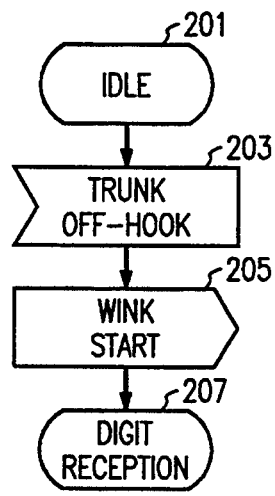
FIGS. 2-6 are flowcharts of actions performed in setting up such connections and in accessing meters and devices in the prior art system of FIG. 1.
Figure 3:
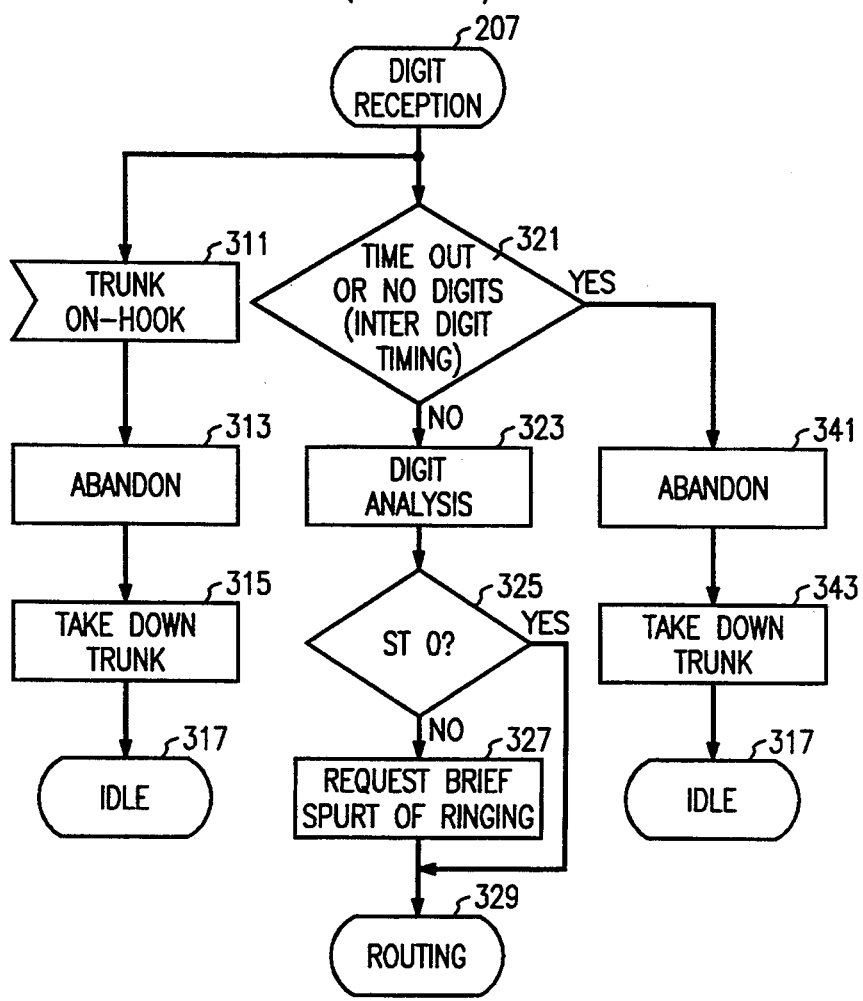
Figure 4:
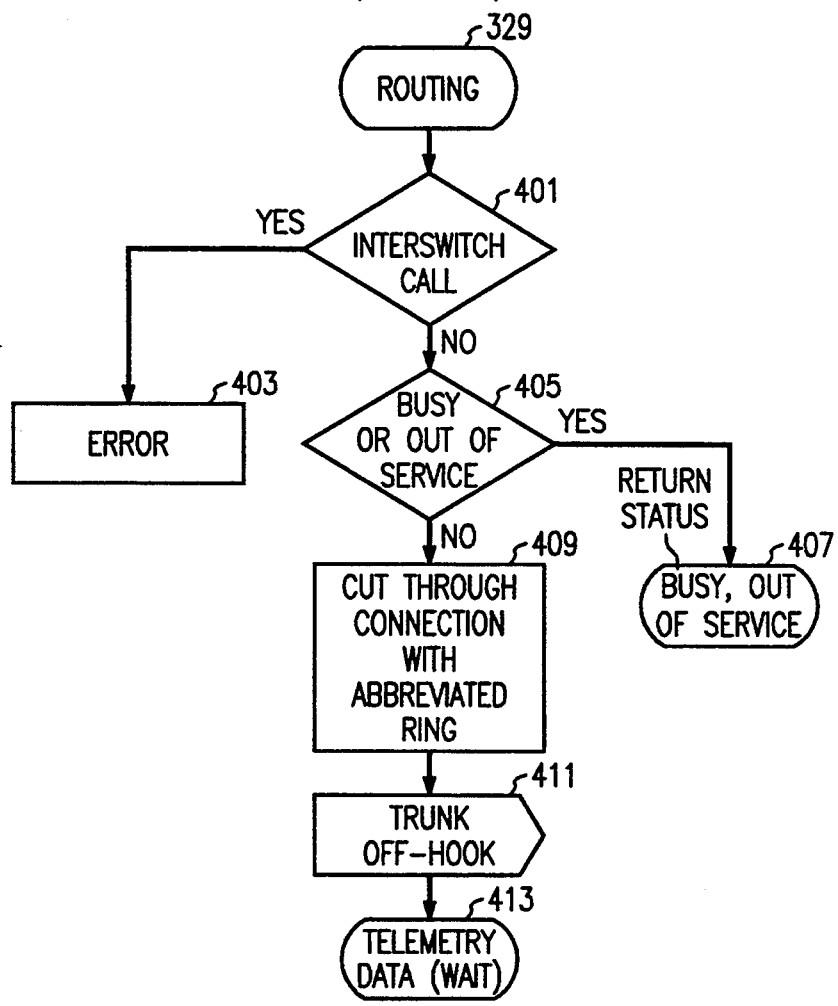
Figure 5:
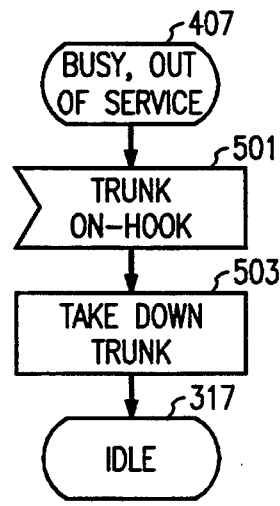

FIGS. 2-6 are flow charts showing the call processing actions that take place while processing a utility telemetry call. FIG. 2 shows the first steps in response to a seizure from a utility telemetry trunk. As shown in FIG. 1, utility telemetry trunks, which are ordinary interoffice trunks, are connectable to different switches. The trunk is originally in the idle state. It goes off-hook (action block 203) and a wink start signal is received from the trunk (action block 205). This is followed by the digit reception state (action block 207). FIG. 3 is a flow chart in response to digit reception. If the trunk goes on-hook during or following digit reception (action block 311 ), the call is considered abandoned (action block 313) and the trunk is taken down (action block 315) and restored to the idle state (action block 317). If there is a timeout or no digits are received as determined by the tests in the interdigit timing (test 321), then the call is considered abandoned (action block 341 ), the trunk is taken down (action block 343) and is restored to the idle state (action block 317). If the digits are properly received, the digits are analyzed (action block 323). If the ST signal is the standard ST signal (ST0) as determined in test 325, the routing sequence 329 is entered. Otherwise, the type of alternate ST signal (ST1, ST2, or ST3) is used to determine the length of a requested burst of ringing and this burst of ringing is requested for application after a connection has been set up to the requested meter interface unit. In this specific example, the length of the bursts are 20, 40 and 60 ms.; further experimentation may indicate that other lengths, such as 50, 100 and 150 ms. may be preferable to take into account, for example, variations in the ability to control the length of a burst. The best arrangement is to permit the length of the burst to be a parameter controllable by the translation recent change facility of modern switches. If more than 3 different lengths (plus 0 length) are required, different groups of utility trunks are used for different groups of ringing burst lengths; for example, group A could be used for 0, 20, 40 or 60 ms. bursts, while group B could be used for 0, 80, 100 and 120 ms. bursts. The burst of ringing is used in the SLC to assign a time slot for the connection to the customer's MIU, but is sufficiently short that it is completed before the connection is actually made; thus, no ringing signal is sent to the MIU. Thereafter, the routing sequence 329 is performed. FIG. 4 is a flow diagram of the steps of the routing sequence. First, a determination is made by test 401 whether the call is an interswitch call. If so, this indicates an error 403 since the utility telemetry trunk used on the call is supposed to be connected to the switch serving the requested meter interface unit. If this is not an interswitch call, then test 405 determines whether the called customer associated with the requested meter interface unit is busy or out of service. If so, then the busy or out of service status is returned to the trunk control program and further actions are performed as described in FIG. 5. If the called customer line is not busy or out of service, then the connection is cut through if necessary with the abbreviated ring as derived in block 327 (action block 409). When the call is cut through to the end user, a trunk off-hook signal is returned to the C.O. service unit 20. The trunk then goes into the telemetry data wait state (413). FIG. 5 describes the actions performed if the called customer associated with the requested meter interface unit is busy or out of service (state 407). An on-hook signal is sent over the utility telemetering trunk to the C.O. service unit 20 (action block 501) and the trunk is taken down. (action block 503). The trunk is then in the idle state (317).

In the telemetry data wait state, it is the responsibility of the C.O. service unit, responsive to signals from the utility controller or internally triggered, to alert the MIU. Using today's equipment, the MIU is alerted by one of 13 single frequencies. Once the MIU has been alerted, other signals such as frequency shift keyed data signals can be used for communicating with the MIU. The end user cannot alert the MIU because the user's station equipment does not have a one-of-13 single frequency generator and, further, the call would be taken down if the end user went off hook.

Figure 6:
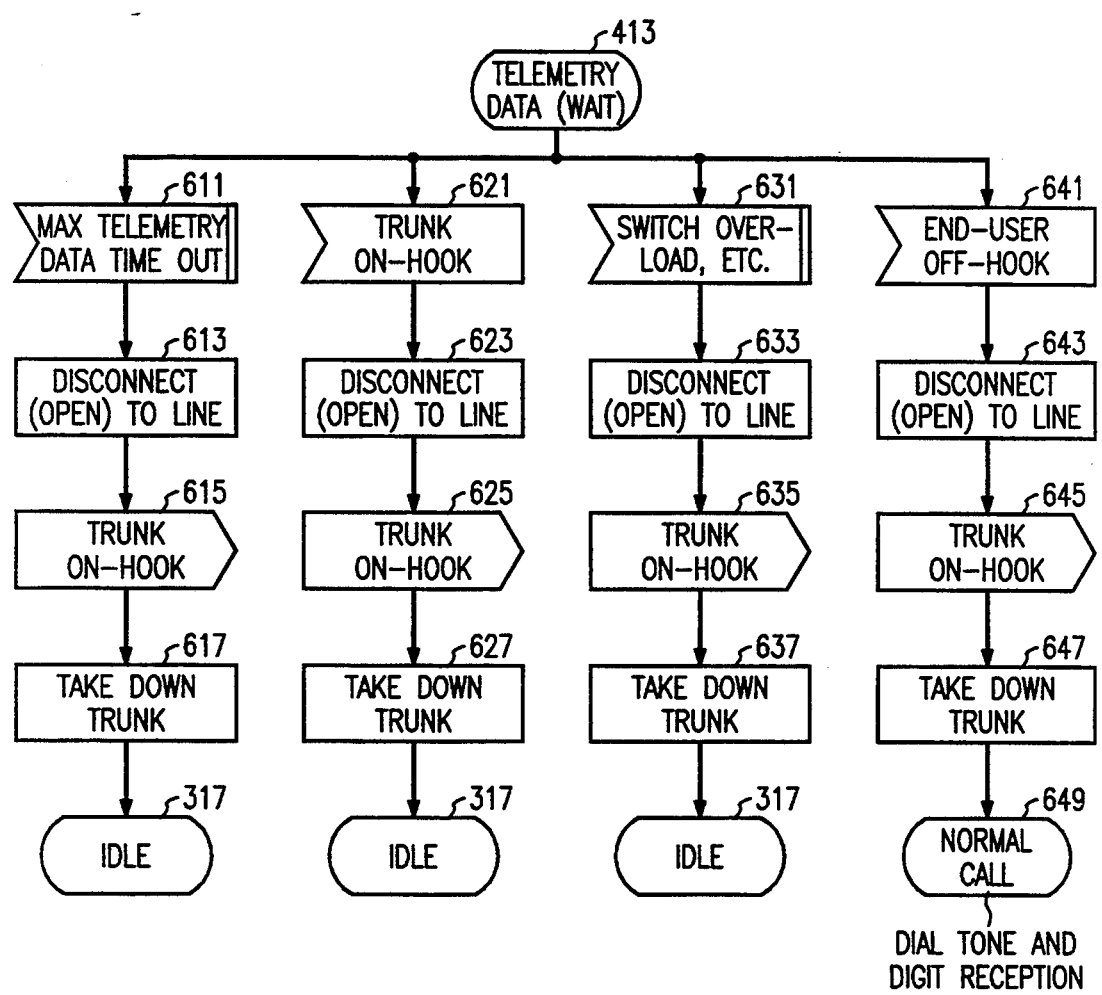

FIG. 6 is a flow diagram of the actions performed in response to various timeout conditions and in response to disconnect signals. The switch is in a wait state (413) during the telemetry connection. If a maximum interval such as 10 or 20 seconds is exceeded (action block 611), the customer's line is disconnected and a signal is sent to the MIU to disconnect (action block 613), an on-hook signal is sent over the utility telemetering trunk to the C.O. service unit (action block 615) and that trunk is taken down (action block 617) and restored to the idle state (317). The same disconnect functions are performed upon completion of a telemetry access call. A billing record is then made in the same way as a billing record is made for a conventional (voice) call. If an on-hook signal is detected on the utility telemetering trunk, indicating a disconnect from the utility side (action block 621), then the line connected to the metering interface unit is disconnected (action block 623), the utility telemetering trunk is sent an on-hook signal (action block 625), the trunk is taken down (action block 627), and restored to idle (317). If an overload or other condition is detected in the switch, indicating that telemetering activities should be temporarily suspended (action block 631), then the customer's line is disconnected (action block 633), an on-hook signal is sent over the utility telemetering trunk (action block 635), that trunk is taken down (action block 637) and restored to the idle state (317). If the end user goes off-hook during the telemetering interval because the end user wishes to place a call (action block 641), then the line is to be disconnected from the telemetering connection, a disconnect is sent from the switch to the MIU (action block 643), the utility telemetering trunk is sent an on-hook (action block 645) and the trunk is taken down (action block 647). The end user is then prepared to be processed in the normal way by receiving dial tone and placing this call by dialing the appropriate digits (state 649).

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. A control method for use by a telephone switching system, said system being in an arrangement where an accessing device is connected by at least one trunk (UTT) to a switching network internal to said switching system, and where said network is connected via customer lines to a plurality of destinations, said method comprising said switching system receiving trunk signaling including a function identifier from said data accessing device on said at least one trunk, said function identifier comprises: customer premises equipment (CPE) alert codes, switch function codes, and control data, in response to said received signaling, said switching system implements control activities including controlling connections between said accessing device and at least one of said destinations via said network and in accordance with said function identifier.

2. A method in accordance with claim 1 where said controlling comprises in response to said signaling, establishing a suppressed ringing connection through said network to said at least one destination.

3. A method in accordance with claim 1 where said controlling comprises in response to said signaling, selecting and generating a device alerting signal within said switching system, and transmitting said generated signal to said at least one destination.

4. A method in accordance with claim 3 after transmitting said generated signal, receiving acknowledgment from said at least one destination, informing said accessing device of said acknowledgment.

5. A method in accordance with claim 1 where said signaling includes a broadcast list specifying a plurality of directory numbers, said method further comprising storing said broadcast list within said switching system.

6. A method in accordance with claim 1 where said signaling includes a directive to a broadcast list stored within said switching system, said list specifying a plurality of directory numbers identifying ones of said lines, and said signaling further includes broadcast data, where said controlling comprises storing said broadcast data, and sequentially broadcasting said broadcast data on said ones of said lines.

7. A method in accordance with claim 6 where said data accessing device is further connected to said switching system by a data link, where said signaling includes a directive to a broadcast list stored within said switching system, said list specifying a plurality of directory numbers identifying ones of said lines, said method further comprising receiving broadcast data on said data link, storing said broadcast data, and sequentially broadcasting said broadcast data on said ones of said lines.

8. A method in accordance with claim 1 where said controlling is performed irrespective of the busy/idle status of the one of said lines connected to said at least one destination.

9. A method for use by a telephone switching system in accordance with claim 1 wherein:

in response to said received signaling, said switching system deactivating a class of features of said switching system for one of said lines, controlling a telemetry call from said accessing device via said at least one trunk and said network to a destination connected to said at least one line, and reactivating said class of features after the completion of said call.

10. A telephone switching system comprising a switching network for interconnecting a multiplicity of telecommunications trunks and a multiplicity of customer lines, at least one of said trunks connectable to a device for accessing a customer premises device, means for selectively generating any one of a plurality of device alerting signals, and processor means for a) translating a class of service of said at least one trunk, b) in response to said translating and to receipt, on said at least one trunk, of a function identification of a first kind, establishing a suppressed ringing connection through said network on which device alerting signals from said accessing device are transmitted to a customer line and c) in response to said translating and to receipt, on said at least one trunk, of a function identification of a second kind, controlling the generation and transmission of device alerting signals from within said switching system to a customer line.

11. A control method for use by a telephone switching system in an arrangement where an accessing device (20) is connected by at least one trunk (UTT) to a switching network internal to said switching system, where said network is connected via customer lines to a plurality of customer premises devices and to voice stations associated with ones of said customer premises devices, said at least one trunk having a class of service defined for telemetry or voice communication, said method comprising receiving trunk signaling including telemetry function identifications from said accessing device via said at least one trunk, controlling telemetry between said accessing device and said customer premises devices via said network in accordance with ones of said identifications, and enabling the communication of voice from said data accessing device to said voice stations via said network in accordance with others of said identifications.

12. A method in accordance with claim 11 where voice communications from said data accessing device are transmitted to said switching system via a data link associated with said at least one trunk.

13. A method in accordance with claim 11 where said enabling comprises in response to one of said other identifications, deactivating a class of line features for one of said voice stations for the duration of a voice communication to said one voice station.

14. A method in accordance with claim 11 wherein said controlling comprises receiving and storing voice messages from said accessing device and transmitting said stored voice messages to said voice stations.

15. A method in accordance with claim 14 wherein said controlling further comprises prior to transmitting one of said stored voice messages to one of said voice stations, transmitting power ringing to said one voice station.

* * * * *